April 17, 1962  R. H. LAWSON  3,029,619
KNITTING MACHINE

Filed July 19, 1956  15 Sheets-Sheet 1

INVENTOR.
ROBERT H. LAWSON
BY
ATTORNEYS

April 17, 1962     R. H. LAWSON     3,029,619
KNITTING MACHINE

Filed July 19, 1956     15 Sheets-Sheet 2

*INVENTOR.*
ROBERT H. LAWSON
BY
*Russer, Smith & Harding*
ATTORNEYS

April 17, 1962   R. H. LAWSON   3,029,619
KNITTING MACHINE
Filed July 19, 1956   15 Sheets-Sheet 3

INVENTOR.
ROBERT H. LAWSON
BY
ATTORNEYS

April 17, 1962
R. H. LAWSON
3,029,619
KNITTING MACHINE
Filed July 19, 1956
15 Sheets-Sheet 4
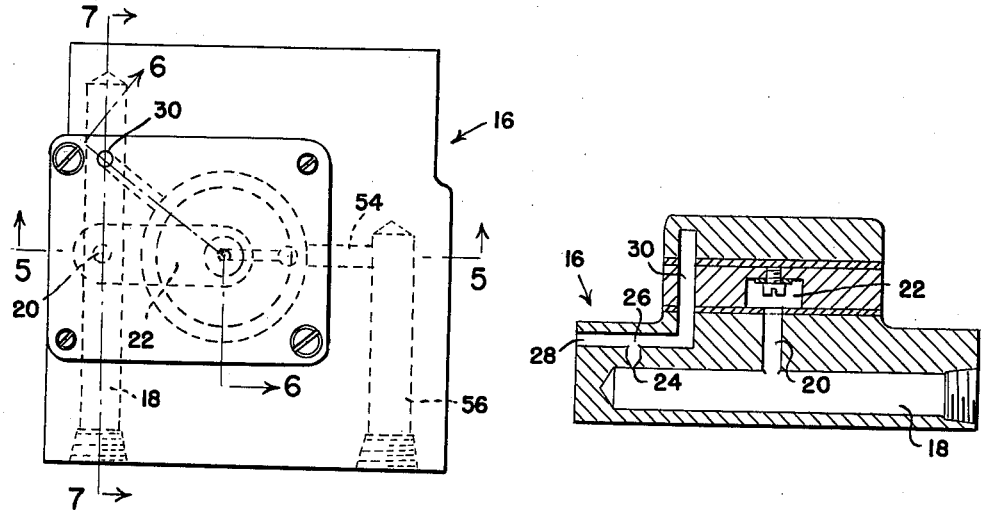
FIG. 4.
FIG. 7.
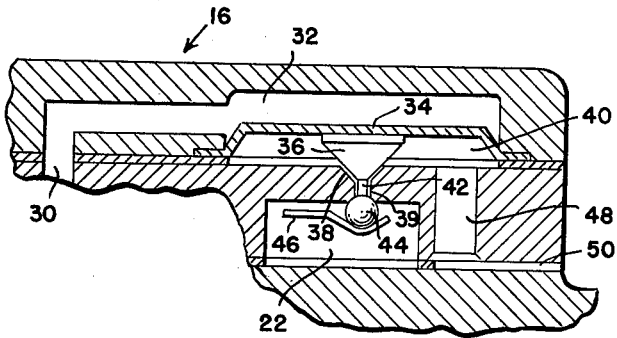
FIG. 6.
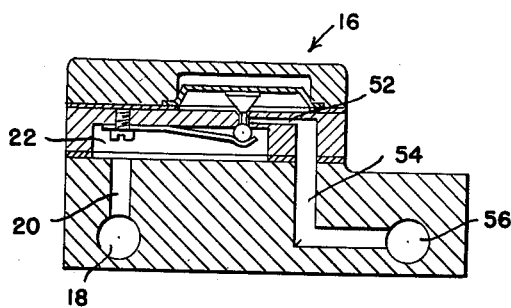
FIG. 5.
*INVENTOR.*
ROBERT H. LAWSON
BY
ATTORNEYS

INVENTOR.
ROBERT H. LAWSON

April 17, 1962  R. H. LAWSON  3,029,619
KNITTING MACHINE

Filed July 19, 1956  15 Sheets-Sheet 6

INVENTOR.
ROBERT H. LAWSON
BY
ATTORNEYS

April 17, 1962

R. H. LAWSON 3,029,619

KNITTING MACHINE

Filed July 19, 1956

INVENTOR.
ROBERT H. LAWSON
BY
ATTORNEYS

April 17, 1962 R. H. LAWSON 3,029,619
KNITTING MACHINE
Filed July 19, 1956 15 Sheets-Sheet 9

INVENTOR.
ROBERT H. LAWSON
BY
ATTORNEYS

April 17, 1962

R. H. LAWSON
KNITTING MACHINE 3,029,619

Filed July 19, 1956

*INVENTOR.*
ROBERT H. LAWSON
BY

ATTORNEYS

April 17, 1962 R. H. LAWSON 3,029,619
KNITTING MACHINE
Filed July 19, 1956 15 Sheets-Sheet 11

INVENTOR.
ROBERT H. LAWSON
BY
ATTORNEYS

April 17, 1962 R. H. LAWSON 3,029,619
KNITTING MACHINE
Filed July 19, 1956 15 Sheets-Sheet 12

INVENTOR.
ROBERT H. LAWSON
BY
ATTORNEYS

April 17, 1962 R. H. LAWSON 3,029,619
KNITTING MACHINE
Filed July 19, 1956 15 Sheets-Sheet 13

INVENTOR.
ROBERT H. LAWSON
BY
ATTORNEYS

April 17, 1962 R. H. LAWSON 3,029,619
KNITTING MACHINE
Filed July 19, 1956 15 Sheets-Sheet 14
FIG. 30.
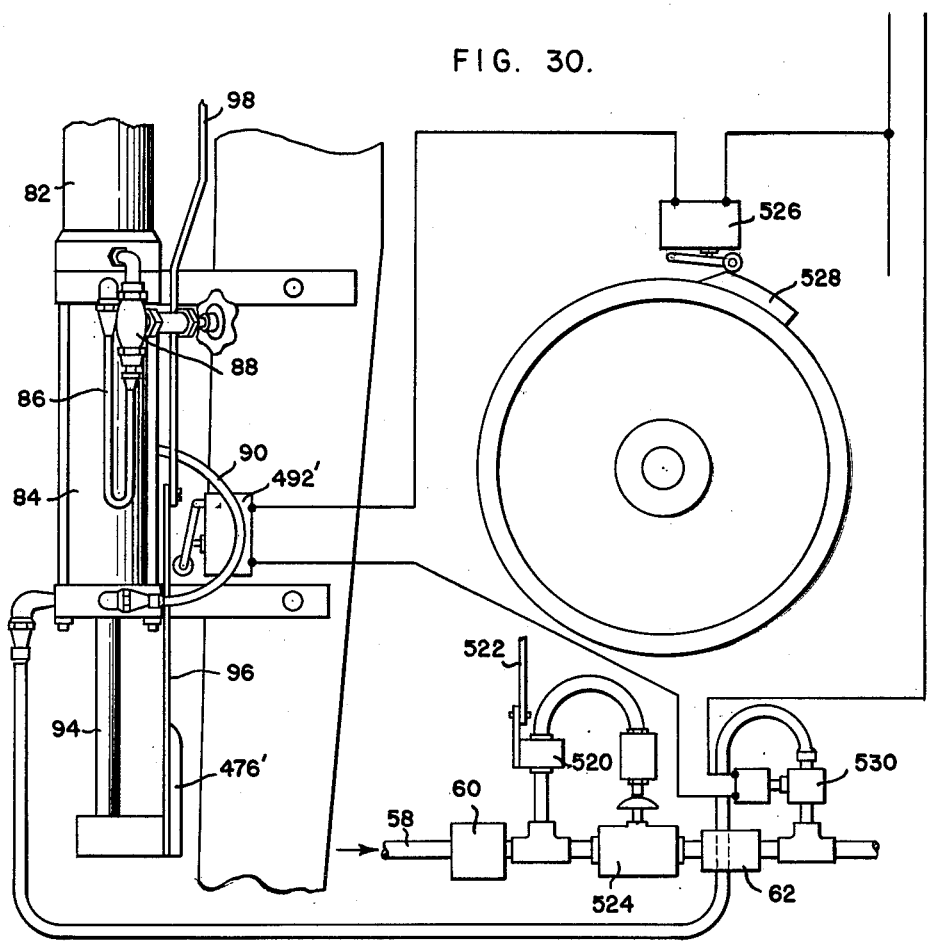
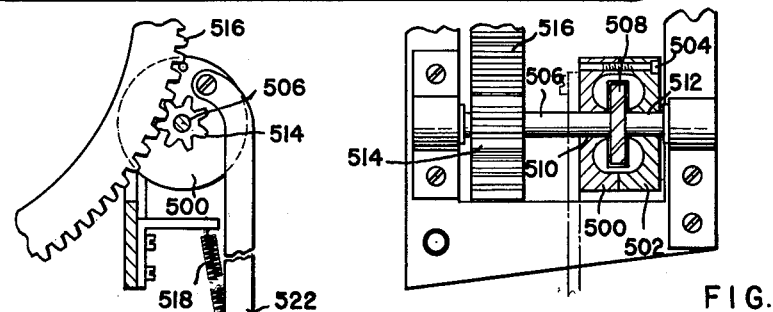
FIG. 31.
FIG. 32.
*INVENTOR.*
ROBERT H. LAWSON
BY
ATTORNEYS

April 17, 1962  R. H. LAWSON  3,029,619
KNITTING MACHINE

Filed July 19, 1956  15 Sheets—Sheet 15

INVENTOR.
ROBERT H. LAWSON
BY
ATTORNEYS

United States Patent Office 3,029,619
Patented Apr. 17, 1962

3,029,619
KNITTING MACHINE
Robert H. Lawson, Pawtucket, R.I., assignor to Scott & Williams, Incorporated, Laconia, N.H., a corporation of Massachusetts
Filed July 19, 1956, Ser. No. 598,829
14 Claims. (Cl. 66—55)

This invention relates to knitting machines and has particular reference to the automatic control of stitch size and is particularly directed to machines for the knitting of sheer ladies' hosiery.

Difficulties are experienced in the knitting of sheer ladies' hosiery, in particular, in that, due to variations in yarn and in the tension of yarn fed to the needles, stitches of varying length or size are produced. The variations in size of individual loops are minute, but due to the fact that a lady's stocking contains a very large number of courses, the minute variations of individual stitch lengths are cumulative to the end that successive stockings produced on the same machine and seemingly under identical conditions will vary greatly with the result that, after finishing, the stockings must be carefully sorted into pairs of approximately equal lengths. Furthermore, while the intention may be to produce stockings of particular lengths, there may be produced undesired numbers of stockings varying so far from the desired lengths that for a mill to fill an order an excessive number of stockings may have to be produced, the stockings of undesired lengths being then retained in hopes of filling an order requiring their lengths.

Furthermore, the variations in stitch lengths may occur in such fashion that groups of courses having stitches of abnormal lengths may be interposed between groups of courses having stitches of normal lengths, and the result in such cases will be the appearance of horizontal shadowy streaks which may make the stockings unacceptable.

Further, stitches may vary in size sufficiently to produce abnormal reductions or increases in stocking circumference causing the stocking to be locally too tight or too loose when worn.

The variations indicated above as of objectionable type are not to be understood as those which are intentionally provided for the shaping of stockings. It is common practice to change stitch size in a smoothly continuous fashion in shaping ladies' hosiery from the calf portions into the ankle portions. Such variations are definitely programmed by the controlling mechanism of the knitting machine. The objectionable variations here under discussion are those which normally occur beyond intentional control.

In the patent to Vernon Thomas Stack, No. 2,685,786, dated August 10, 1954, there is disclosed mechanism in a knitting machine for the automatic control of stitch lengths having as its object the prevention of shadow streaks or rings, the production of proper stocking diameters, and the attainment of stockings of desired overall lengths. In accordance with the mechanism of said Stack patent, there is provided detection of variations of lengths of stitches as the stitches are being formed, with provision for correction of stitch lengths so as to avoid the cumulative occurrence of stitches in large groups of successive courses which would lead to the objectionable results above discussed. In brief, in accordance with the said patent, the positions of sinkers are detected to give rise to signals indicative of variations of stitch lengths from normal, and the signals thus produced control through reversible electric motor means devices which change the relative positions of the stitch drawing needle cams and the ledges of sinkers over which the stitches are drawn. The mechanism so shown allows for the intentional variations of stitch length incidental to the usual fashioning or shaping procedure, but prevents deviations from the locally normal stitch lengths in such fashion that cumulative errors do not occur.

It is the general object of the present invention to improve the mechanism of the general type disclosed in said Stack patent for the purpose of control of the stitch lengths.

In accordance with the present invention, the control is pneumatic rather than electrical. The pneumatic control I have provided produces smooth and reliable operations, avoiding the possibilities of failure of electrical elements and the complexities involved in electrical control. Furthermore, from a practical standpoint, a single type of pneumatic mechanism may be provided for all localities, domestic and foreign since, except for a driving motor for the air supply, it is independent of the local power supply which may vary from place to place in voltage and frequency and would necessitate the provision of wholly different electrical systems for various places. Due to the relatively slow and smooth action of the pneumatic control provided, sudden variations in stitch lengths or sizes are prevented, and this is highly desirable since any sudden change in stitch length will be noticeable as a streak or mark in the fabric. Desirably the corrective actions should be slow so that in successive courses, even though a corrective action is taking place, there will be no change in stitch length which will be apparent to the eye. However, provision is made in accordance with the invention for quick changes in stitch length where that is desired as in transitions from the welt to the shadow welt or from the shadow welt to the leg.

Further objects of the invention relate to the attainment of stitch control in various fashions which may be individually most desirable for particular purposes in conjunction with special operations involved in the knitting. In accordance with the invention the stitch lengths are changed by various types of manipulations of the yarn at the time that stitches are drawn.

The foregoing and other objects particularly relating to details will become apparent from the following description read in conjunction with the accompany drawings in which:

FIGURE 4 is a plan view of a suitable type of pneumatic relay utilized in carrying out the invention;

FIGURE 5 is a vertical section taken on the plane indicated at 5—5 in FIGURE 4;

FIGURE 6 is an enlarged vertical section taken on the broken surface indicated 6—6 in FIGURE 4;

FIGURE 7 is a vertical section taken on the plane indicated at 7—7 in FIGURE 4;

FIGURE 30 is a diagrammatic elevation showing certain air controls involved in the machine;

FIGURE 31 is a fragmentary elevation showing valve operating means controlled in accordance with operation of the machine;

FIGURE 32 is a sectional view of the same;

As noted above, the invention is particularly applicable to knitting machines for the production of ladies' sheer hosiery wherein the matter of stitch control is particularly important, though it will be evident that the invention is more broadly applicable to knitting machines generally.

Figure 1:
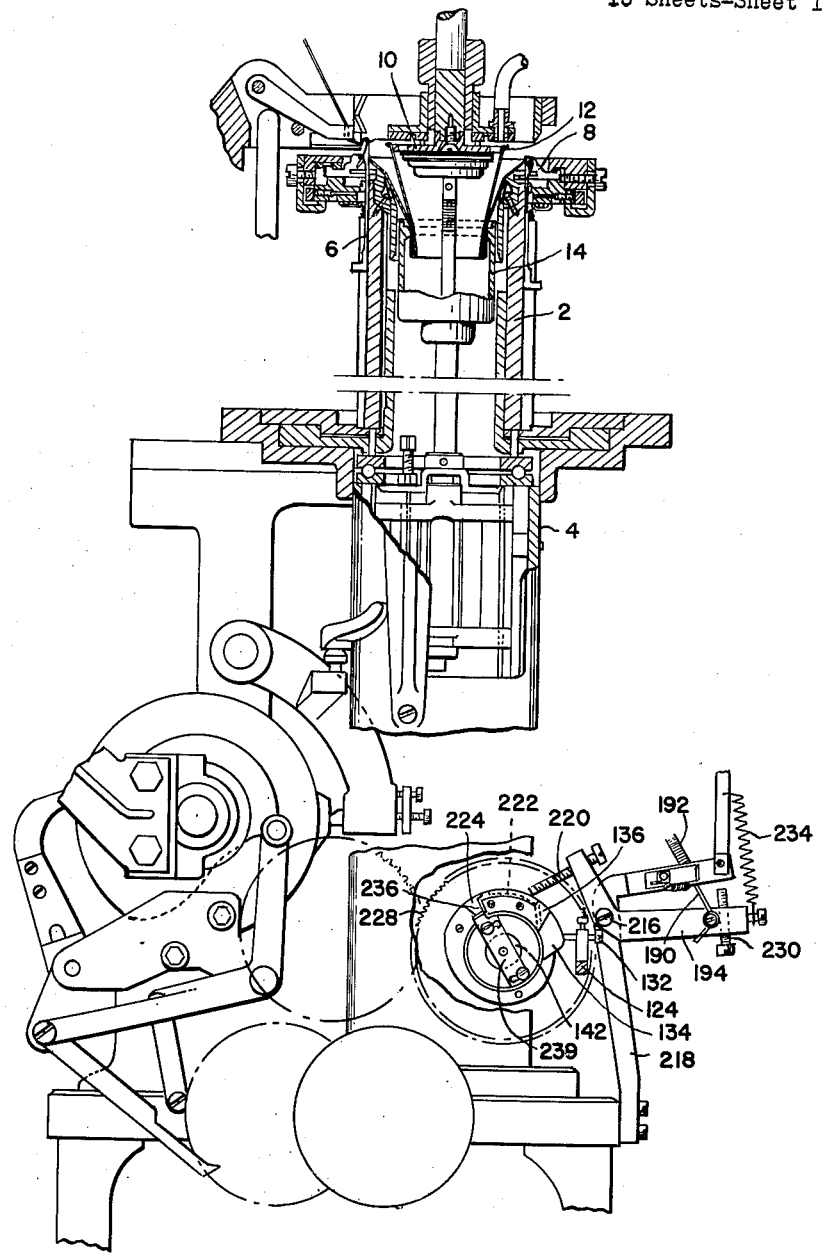
FIGURE 1 is an elevation, partly in section, showing in particular certain conventional elements of the type of knitting machine to which the invention may be applied.

For purposes of illustration, the invention will be described as applied to a machine of the type arranged to knit ladies' sheer hosiery, the machine which will specifically be referred to being of the type disclosed in my Patents No. 2,625,026, dated January 13, 1953, and No. 2,709,352, dated May 31, 1955. Such a machine, certain parts of which are indicated in FIGURE 1, comprises a slotted needle cylinder 2 associated with which is the non-rotating but axially movable cylinder raising tube 4 which is vertically moved for the purpose of control of stitch length. Heretofore such a tube has been raised intermittently to control changes in stitch length as between major parts of the complete stocking and in particular where yarn changes have been effected, and also for the gradual control of stitch length to produce proper fashioning of a stocking from the calf into the ankle. The adjustment of stitch length in this fashion is well known and is the result of changing the vertical height relationship between the ledges of the sinkers 8, over which the stitches are drawn by the needles 6, with respect to the level of the cams (not shown) which are at a generally fixed height and control the needle movements. In accordance with one form of the present invention, the tube 4 is additionally controlled for the correction of stitch lengths. The machine is illustrated as comprising also the dial 10 which carries transfer elements 12 for the production of turned welts. Also indicated is a grab takeup 14 of the type described in detail in my prior patents, which takeup makes possible the maintenance of proper tension during the knitting of stockings which are individually and separately knit, each being started on bare needles. In the remaining portion of the description herein there will be referred to only those elements which are intimately concerned with the invention herein involved, it being understood that the knitting machine is otherwise of conventional type arranged to knit complete stocks including heels and toes.

Reference may first be made to a pneumatic relay shown in FIGURES 4 to 7, inclusive, two of such relays being used in the various pneumatic control systems hereinafter referred to. The relay comprises a multi-part housing 16 which provides various air connections and chambers and contains operating valve means. The housing provides an air supply passage 18 which communicates through a passage 20 with a chamber 22. The passage 18 also communicates through a restricted orifice 24 with a passage 26 which at one end 28 is arranged to be connected to a nozzle as will be hereafter described and at its other end through extension 30 to a chamber 32 a portion of the lower wall of which is provided by a flexible diaphragm 34. The diaphragm 34 carries a conical valve member 36 which cooperates with a conical seat portion 38 of a passage 39 which connects the space 40 beneath the diaphragm 34 with the chamber 22. The valve member 36 is provided a stem 42 of smaller diameter than the passage 39 which is arranged to engage and press downwardly a ball 44 which acts as a valve member to seat in the lower end of the passage 39 to close the passage, the ball 44 being urged upwardly by a light leaf spring 46. Passages 48 and 50 furnish communication between the space 40 and the atmosphere. Communicating with and extending laterally from the passage 39, is a passage 52 which, through its extensions 54 and 56 provides a controlled air outlet.

As will hereafter appear, a nozzle connected to the end 28 of passage 26 is controlled by a movable baffle which, by impeding the escape of air to the atmosphere produces, in conjunction with the fixed orifice 24, a variable pressure condition in the connection 30 and the chamber 32. As the pressure in this chamber increases, the valve member 36 is moved by diaphragm 34 toward a position closing the upper end of passage 39 and unseating the ball 44 from the lower end of this passage so that communication is afforded between the chamber 22, which receives the supply air, and the air outlet at 56. On the other hand, if the flow of air from 28 is relatively unimpeded by movement of the baffle away from the corresponding nozzle, the pressure in chamber 32 is reduced due to the resistance to flow imposed by the orifice at 24, and the diaphragm 34 is raised by the action of spring 46 which seats the ball 44 and raises the valve member 36 so that the passage 39 is put in communication with the atmosphere through the space 40 and the venting passages 48 and 50. The result is that, when the valve member 36 is in fully opened position, the outlet 56 is connected to the atmosphere. In this fashion a relay action is secured providing either the supply pressure or atmospheric pressure at the outlet 56 in dependence upon the position of a baffle associated with a nozzle connected to the end 28 of passage 26. Relays of this type are well known in industrial uses, and details of its operation need not be described. It will suffice for the present instance to state that the relay is capable of providing a very large pressure difference under control of minute movements of the baffle referred to.

Figure 3:
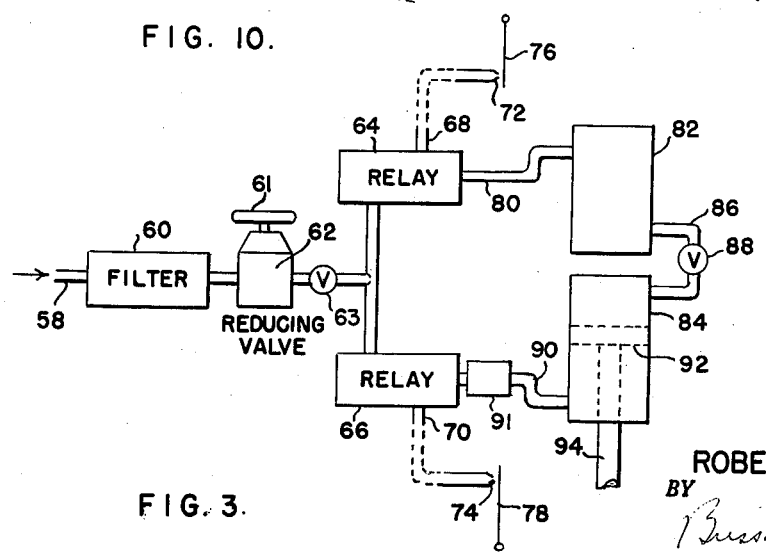
FIGURE 3 is a diagram illustrating the connections of a preferred type of pneumatic system.
Figure 9A:
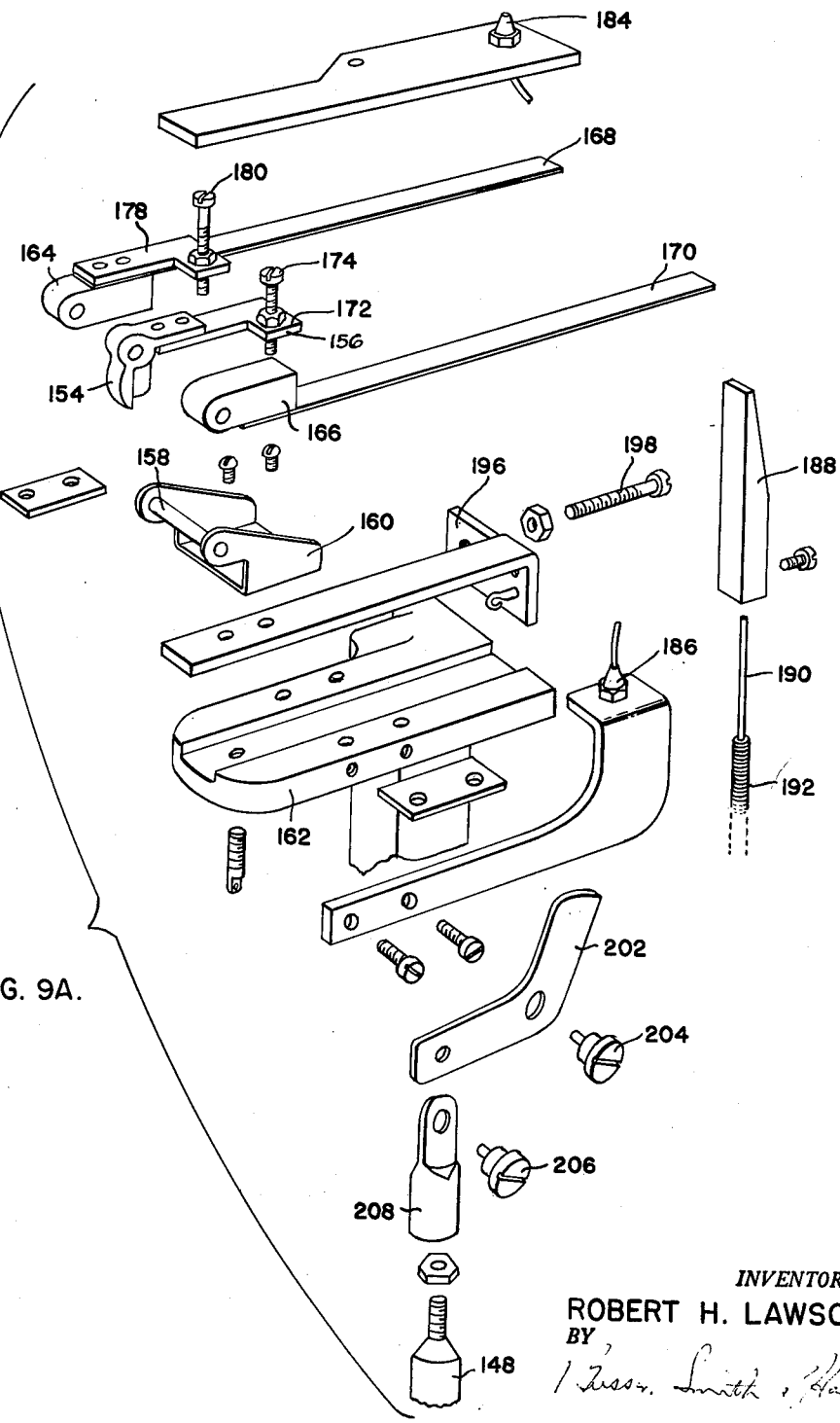
FIGURE 9A is an exploded view showing various parts of FIGURE 9 and explanatory of their assembly.
Figure 29:
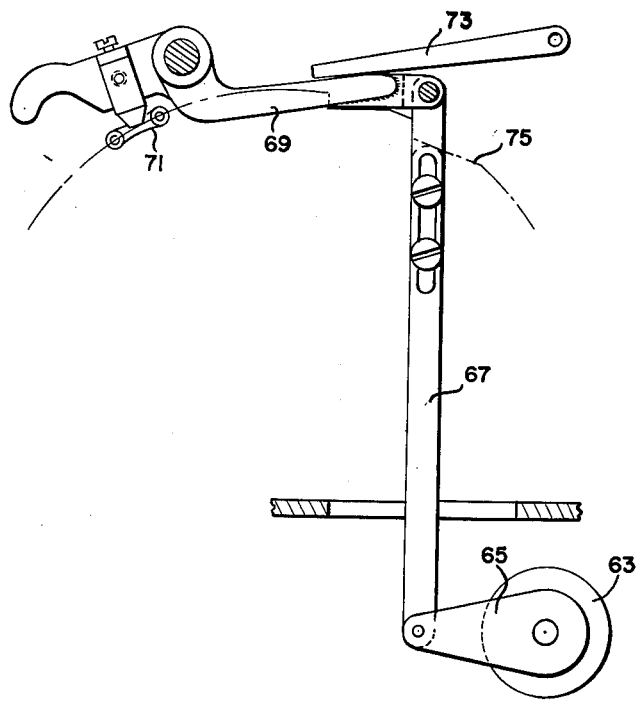
FIGURE 29 is a fragmentary elevation illustrating a valve control provided in the machine.

FIGURE 3 shows a typical diagram of a pneumatic system incorporating relays of the type just described which may be used for stitch control purposes in the various arrangements hereafter discussed. Air is supplied at suitable high pressure at 58 through a filter 60 to a reducing valve 62 adjustable by means of a knob 61 so as to provide the desired input pressure to the relays 64 and 66, through a valve 63 which, as shown in FIGURE 29 is controlled through an arm 65 which is connected by link 67 to an extension of the conventional lever 69 activated by the pattern chain 71 to enable the usual pawl 73 to engage the drum ratchet wheel 75. Reducing valves are well known which will maintain substantially constant output pressure for large fluctuations of input pressure and such valves are desirably used in a mill where the supply pressure may fluctuate considerably in view of intermittent uses of large amounts of air for other purposes associated with a number of knitting machines. The control connections 68 and 70 for the relays, corresponding to connections to the passage 26 at 28 of the relay already described, terminate in nozzles 72 and 74 with which cooperate baffles 76 and 78 arranged to control the outflow of air from the nozzles. While a pair of baffles are shown herein it has been found that equally satisfactory results may be obtained by one baffle operating between directly opposed nozzles. However, the principle of control of the double baffles shown herein apply to control of the single baffle. The relay 64 is shown as having its output connected at 80 to an accumulator 82 in the form of a tank containing oil. The oil-containing space of this accumulator 82 is connected to one end of the cylinder 84 through a connection 86 controlled by an adjustable valve 88. The cylinder 84 contains a piston 92 to which is secured a piston rod 94 from which mechanical power is derived. The output of the relay 66 is connected at 90 through a filter 91 to the side of the piston opposite that supplied through connection 86. Filter 91 is so arranged that any liquid leaking past piston 92 will be prevented from entering relay 66. Considering specifically the arrangement shown in FIGURE 3 (which may be replaced by numerous pneumatic arrangements known to the art), if the baffle 76 approaches more closely to the nozzle 72, pressure in the relay 64 will be built up above the diaphragm 34 thereof providing pressure air from the supply through the connection 80 to displace oil from the accumulator 82 to drive the piston 92 downwardly. The valve 88 is desirable since, by partial closure of this valve, the oil flow, due to its viscosity, may be slowed down to provide a smooth slow movement of the piston 92 rather than a rapid movement. Slow movement is desirable not only to prevent hunting but further in the case of stitch length adjustment since a rapid adjustment of stitch length might result in such a sharp change in the stitches that a visible shadow ring or other marking might result. Desirably the change is a gradual one so that substantial change will not occur except over a knitting period of several courses. As will be evident, if the baffle 78 is moved toward its nozzle and the baffle 76 simultaneously moved away from its nozzle a reverse action will occur involving upward movement of the piston 92 and reverse flow of oil through connection 86 and valve 88 from the cylinder to the accumulator. As will appear hereafter the baffles corresponding to 76 and 78 are moved oppositely with respect to their nozzles so that reverse movements of the piston 92 correspondingly occur to effect corrective actions in one of the fashions which will be described. It may be noted that the pneumatic control may be of one of the more elaborate types well known in the process control art to achieve fine control with avoidance of hunting, though the simple control described has been found highly satisfactory for stitch control purposes.

It is desirable in machines of the type herein disclosed to shut off the main air supply when the machine stops due to the operation of the stop motion or for other cause such as failure of the main power supply or manual stopping of said machine. Heretofore, air used in conjunction with a grab take-up has been shut off, when the machine was manually stopped, to prevent waste of air.

In the present instance, where the stitch size is servo controlled thru a detector cam 150, whose control action is hereafter described, stopping of the machine with the air on may cause the piston 92 to travel to its extreme in one direction or the other depending upon which of the relays 64 or 66 happens to be activated when the machine stops, if the comparatively simple system hereinbefore described is used. An extreme stitch such as would be obtained when the piston 92 goes to one extreme or the other in its cylinder 84 would cause difficulty in restarting the machine due to the stitch being too tight or loose and of course would in any case result in loss of the stocking.

One example of a control for shutting off the air when the machine stops for any reason is shown in FIGURES 30, 31 and 32. This control consists of housings 500 and 502 held together by screws 504. A shaft 506 carrying a bladed rotor 508 passes thru bearings 510 and 512 respectively in housings 500 and 502. These bearings carry seals such as may be provided by O rings to prevent lubricant inside housings 500 and 502 from passing out between rotating shaft 506 and bearing 510 and 512. Shaft 506 also carries fastened thereto a gear 514 which meshes with the "bull" gear 516 with which machines of the type here disclosed are equipped, being used to drive a quadrant gear (not shown) thru a connecting rod (not shown) to oscillate the cylinder during the making of heels and toes. Gear 516 always travels in one direction regardless of whether the needles are revolving or reciprocating.

Bladed rotor 508 is made integral with shaft 506 as by brazing and as said shaft 506 is caused to rotate the rotor 508 revolves inside housings 500 and 502. Housings 500 and 502 are provided with cavities separated by walls and the latter approach the blades of rotor 508, being separated therefrom by a very small clearance being measured in one or two thousandths of an inch. Housings 500 and 502 with the rotor 508 therein are completely filled with a grease that will substantially maintain its density over a wide heat range, for example, a silicone grease. The movement of the grease caused by the angle blades on rotor 508 from cavities in one of the housings 500 and 502 to the cavities in the other housing causes a variable torque to be applied to said housings dependent on the speed with which rotor 508 is turned.

This device has been so designed and the gear ratio between 516 and 514 is such that when the machine is run at its slowest normal speed sufficient torque is built up in housings 500 and 502 to cause them to revolve clockwise as seen in FIGURE 31 against the tension applied by spring 518 thus opening valve 520 through link 522. Spring 518 acts normally to close valve 520 immediately upon stopping of the machine with consequent loss of torque to housings 500 and 502. Spring 518 through link 522 revolves said housings 500 and 502 anti-clockwise (FIGURE 31) lifting the lever of valve 520 and closing it.

Air is supplied to valve 520 immediately following its passage through filter 60 and before entering an air controlled pilot operated valve 524 located between filter 60 and reducing valve 62. Thus air is available to valve 520 regardless of whether valve 524 is open or closed but air is available to the grab take-up and the pneumatic stitch control only when valve 524 is open. Running of the machine causes housings 500 and 502 to revolve clockwise as explained above overcoming the tension in spring 518 and opening valve 520 thus supplying air to the pilot side of valve 524 causing the opening of said valve 524 and the consequent supplying of air to various parts of the machine as required. Stopping of the machine or even abnormal slowing down of the machine releases the torque built up in housings 500 and 502 allowing spring 518 to return to a position where thru connection 522 they will cause valve 520 to close, which in turn shuts off main valve 524.

Changing the density of grease in housings 500 and 502, changing the relative diameters of these housings and rotor 503 and also changing the tension in spring 518 will cause opening and closing of valve 520 to occur at different speeds of the knitting machine as may be desired.

Referring now particularly to FIGURES 2 and 8 to 15, inclusive, there is shown therein one form of the invention in which control of the length of stitches is effected by adjustment of the height of the needle cylinder relative to the needle operating cams. This, in effect, changes the height of the sinker ledges relative to the needle wave thereby providing variations in the loops drawn by the needles over the sinker ledges.

Figure 2:
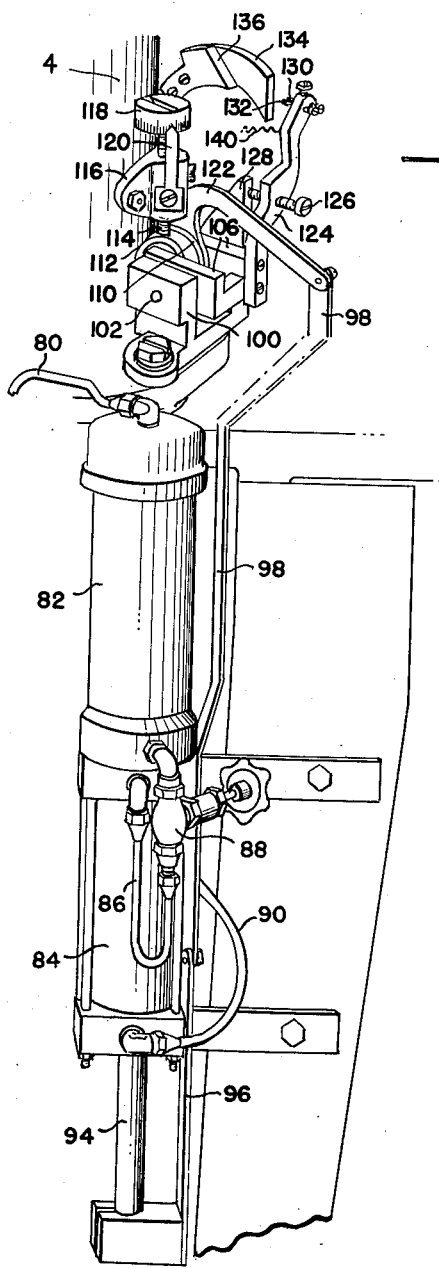
FIGURE 2 is a fragmentary elevation showing pneumatic elements involved in changing the height of a needle cylinder.
Figure 8:
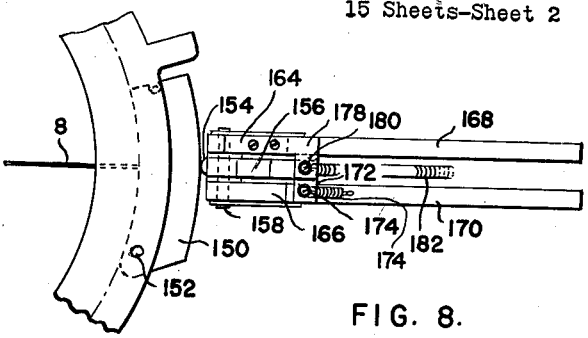
FIGURE 8 is a fragmentary plan view showing in particular the detecting means for abnormal stitch length.
Figure 14:
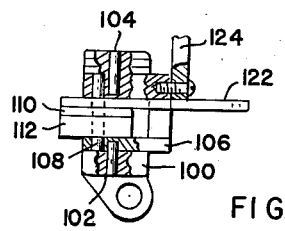
FIGURE 14 is a sectional plan view showing details of the mechanism illustrated in the upper portion of FIGURE 2.
Figure 9:
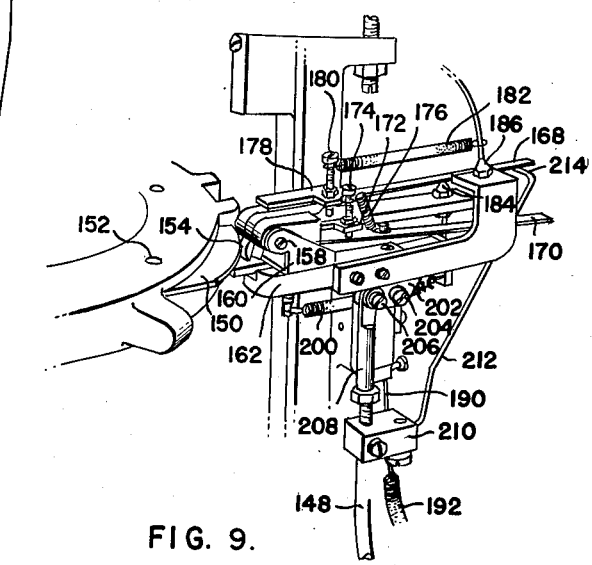
FIGURE 9 is a perspective view showing the details of the detector.
Figure 15:
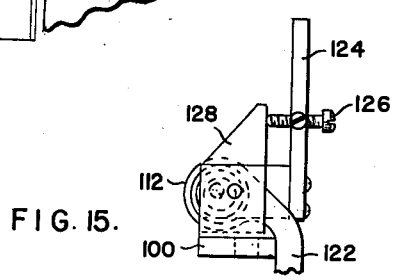
FIGURE 15 is an elevation of the same.

The physical arrangement of the accumulator 82 and cylinder 84 and their associated parts, diagrammed in FIGURE 3, is shown in FIGURE 2, the accumulator and cylinder being secured to a leg of the knitting machine as illustrated therein. The piston rod 94 has connected to it a plate 96 which through a link 98 is connected to operate the devices controlling the height of the needle cylinder through adjustment of the tube 4. A fixed bracket 100 has mounted therein a pair of aligned pivot pins 102 and 104 on which there is pivotally mounted a stirrup 106. A shaft 108 mounted in this stirrup supports for oscillation a member 110 the circumference of which is eccentric to the axis of the shaft 108 and mounts a ball bearing 112 the purpose of which is to reduce friction. Engageable with the outer race of this ball bearing is an adjustable screw 114 threaded in a bracket 116 secured to tube 4 and provided with a graduated head 118 the position of which may be read against an index pointer 120. Secured to the member 110 is an arm 122 which has a pivotal connection with the link 98. An arm 124 secured to the stirrup 106 is provided with an adjustable screw 126 arranged to abut during certain phases of operation a fixed extension 128 of the bracket 100 under the action of a spring 140, thereby limiting swing of the stirrup in a cylinder-lower direction. The arm 124 at its free end is provided with a pair of adjustable screws 130 and 132 which are arranged to be engaged, respectively, by the cams 134 and 136 carried by the fashioning drum 138. If desired, adjustable screw 126 may be placed in line with screws 130 and 132 to operate on a third cam carried by the fashion drum 138. As will further appear hereafter, the motions involved are the following:

Assuming the pivot at the outer end of arm 122 in fixed position, i.e., the link 98 stationary, the stirrup 106 may be rocked by the actions of cams 134 and 136 thereby effecting movement bodily of the shaft 108 and member 110 and the ball bearing 112 which it carries. Pivotal movement in such case is about the axis of the pins 102 and 104. On the other hand, if the stirrup 106 is in a rest position with the screw 126 engaging extension 128 or with one of the pins 130 or 132 engaging its corresponding cam, the movement of arm 122 by link 98 will effect rocking of the eccentric member 110 about the axis of shaft 108 thereby producing rise or fall of the ball bearing 112 to effect corresponding rise or fall of the tube 4 and needle cylinder. The reasons for these motions will be later described.

The shaft 142 of the main pattern drum of the machine, which is conventional and not shown, has secured to it, by location on its driving gear, a cam 144 which is arranged to operate on a plunger 146 which is connected to a link 148. This serves for activation or deactivation of the pneumatic controlling means as will appear hereafter.

A detector cam 150 which rides on the butts of sinkers 8 is pivoted at 152 in a slot in the sinker cap. Engageable with this detector cam is the depending finger 154 of a lever 156 which is pivoted on a pin 158 fixed in a slide 160 which is slidable toward and from the axis of the needle cylinder in a fixed bracket 162. Two other levers 164 and 166 are also mounted to pivot on the pin 158 and carry respectively the baffles 168 and 170 which correspond, respectively, to the baffles 76 and 78 diagrammed in FIGURE 3. Lever 156 is provided with a lateral extension 172 in which is threaded an adjustable screw 174 the lower end of which is arranged to bear upon the baffle 170. A spring 176 between the baffle and screw urge them into engagement. An extension 178 of lever 164 has threaded therein an adjustable screw 180 which bears upon the end of lever 156. A spring 182 reacting between the screw 180 and a fixed element serves normally to maintain the engagement between screw 180 and the lever 156. The baffles 168 and 170 cooperate, respectively, with the nozzles 184 and 186 corresponding, respectively, to the nozzles 72 and 74 in FIGURE 3, and opening, respectively, upwardly and downwardly. As will be evident from the prior description of FIGURE 3, when the baffle 170 closes off flow of air from nozzle 186 there will be built up pressure beneath the piston 92 to effect rise of the piston and consequent rise of the tube 4. On the other hand, if baffle 168 closes nozzle 184, the piston will be moved downwardly and, correspondingly, the tube 4 will be moved downwardly. The use of the eccentric member 110 provides for only slight movements of the tube 4 for very considerable movement of the lever arm 122 and the piston rod 94. For example, in a typical case, the tube 4 is moved about 0.035 inch for a piston movement of 4 inches.

A wedge 188 is arranged for vertical movement in the bracket 162 and is moved by a heavy Bowden wire 190 which extends through a sheath 192 and is connected to a lever 194. The slide 160 is provided at its outer end with a plate 196 in which is threaded an adjustable screw 198 which rides on the wedge 188. A spring 200 urges the slide 160 toward the axis of the needle cylinder. A lever 202 which is pivoted to the frame at 204 is connected at 206 to an adjustable extension 208 of the link 148. The outer end of the lever 202 engages the plate 196 so that, as link 148 is raised through the action of cam 144 the slide 160 is moved outwardly from the needle cylinder. Secured to the upper end of the link 148 is a block 210 which is provided with a wire arm 212 having a portion 214 underlying the baffle 168. The arrangement is such that as the link 148 is raised the baffle 168 is raised away from its nozzle 184.

Figures 10, 11:
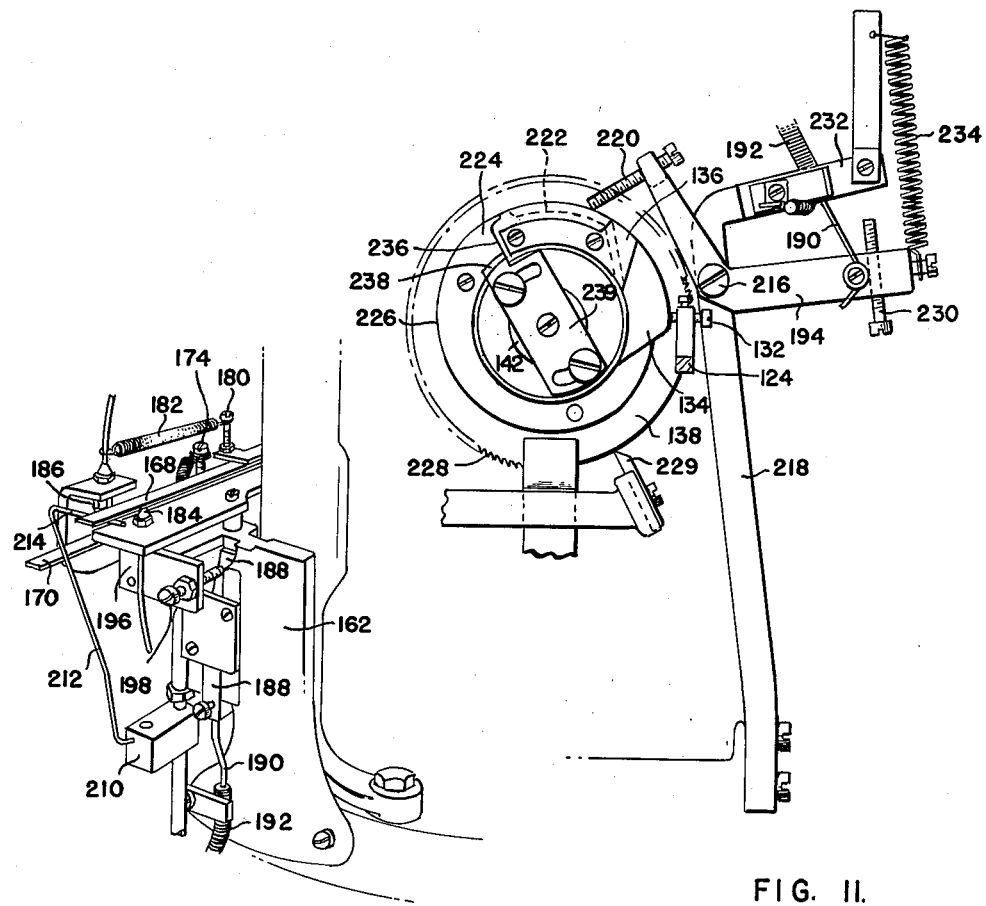
FIGURE 10 is a further perspective view showing details of the detector.
FIGURE 11 is a fragmentary elevation showing certain elements particularly involved in the fashioning control of the stocking formation.
Figure 12:
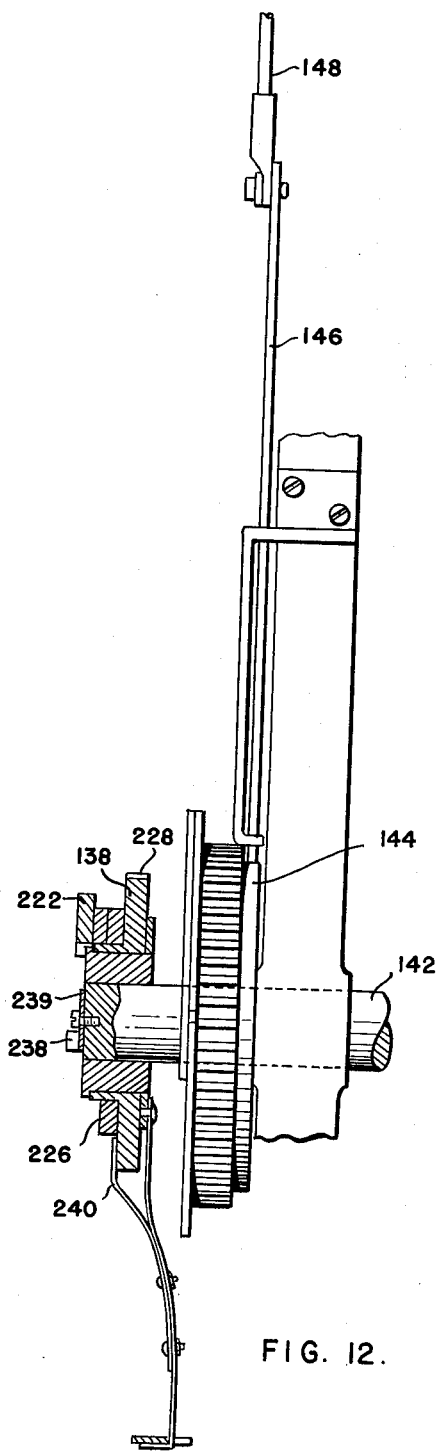
FIGURES 12 and 13 are fragmentary elevations, partly in section, showing certain details of the controlling mechanism.
Figure 13:
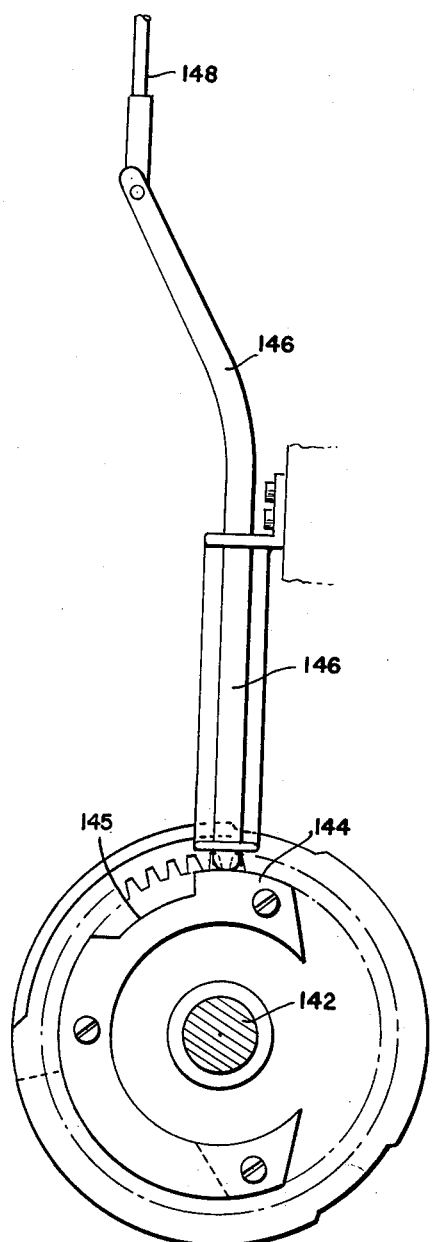

The lever 194 to which reference has already been made is pivoted at 216 to a bracket 218 and is provided with three aligned adjustable screws 220 only one of which appears in FIGURE 11. These screws are respectively adapted to be engaged by cams 222, 224 and 226 carried by the fashioning drum 138 which is journalled on the shaft 142 as shown in FIGURE 12. The fashioning drum is provided with ratchet teeth 228 extending approximately two-thirds of the way about its circumference and arranged to be acted upon in usual fashion by a pawl 229 which reciprocates during operation of the machine. An adjustable screw 230 is mounted in the lever 194 and is arranged to limit its counterclockwise movement under the action of spring 234 by abutment with the lateral extension 232 of the bracket 218. The cam 222 is contacted by lip 238 to advance drum 138 where teeth 228 are omitted. Said lip 238 is provided on a plate 239 secured to the shaft 142. A spring brake 240 holds the fashioning drum 138 in position against accidental displacement and also serves to restrain overrun of this drum.

The operation of the arrangement just described is as follows:

During the makeup at the start of the stocking the height of the needle cylinder is controlled in the usual manner from the main cam drum of the machine. At this time the piston 92 will be in the position resulting from the formation of the angle of a previous stocking, and will be, therefore, in a lowered position corresponding to automatic control of tight stitches. It may be here noted that the automatic control of the needle cylinder through the action of ball bearing 112 on screw 114 does not interfere with raising of the cylinder by conventional control from the main cam drum of the machine, though it would interfere with such lowering of the cylinder. However, if it is desirable in the making of certain stockings to still further lower the cylinder, for the heel and toe for example, beyond the lowest position achieved by such cylinder in the making of the ankle then this can be arranged by having screw 126 ride on a third cam on the fashion drum instead of against abutment 128. The follower 146 is at this time raised by cam 144 and, consequently, the slide 160 is in retracted position with the result that baffle 170 is clear of the nozzle 186. At the same time the end 214 of wire 212 holds the baffle 168 raised from nozzle 184. The air system is accordingly deactivated, so that the piston remains as stated. If desired, the air system may also be deactivated by closure of an air valve from the main cam drum, though such deactivation would serve no purpose except to prevent waste of air through the nozzles.

During the fashioning of the ankle of the preceding stocking the pawl 229 will have advanced the ratchet 228 until, following the engagement of the trailing tooth, it will be riding idly upon the portion of the drum 138 which has no teeth. During the formation of the heel, foot, and toe of the preceding stocking and the initial part of the makeup of the new stock the shaft 142 will have stepped about, but will not have caused lip 238 to engage the portion 236 of cam 222. During the last drum move involved in the makeup, the shaft 142 will have a step so that 238 will engage 236 to move the cam 222 beneath the corresponding screw 220 to position the lever 194 and the wedge 188 properly for the making of welt stitches. At the same time, cam 134 which also is attached to drum 138 engages screw 130 to raise ball bearing 112 to a position a little short of that which, with lever 122 lowered would produce proper welt stitches. Desirably at this same time the usual quality control cams are moved to effect movement of the needle cylinder to a height which would correspond to the production of welt stitches slightly tighter than desired.

Also at this same time the rod 146 is released by the cam 144. The result is that baffle 168 is released and the slide 160 moves inwardly to engage follower screw 198 with the wedge 188 occupying now a position corresponding to the production of proper size welt stitches. The sinker detector cam 150 will now be in a position slightly outwardly of that desired in view of the formation of welt stitches tighter than desired, and consequently lever 156 will be rocked counterclockwise to engage baffle 170 with nozzle 186. The piston will accordingly be caused to rise as already described to move the lever 122 in the direction to effect a proper cylinder level. As slackening of stitches results, the needle cylinder being raised by the automatic control through lever 122 above the position previously determined by the conventional stitch quality control cam on the main cam drum, the sinkers are moved inwardly under the action of detector cam 150 through the action of spring 182, effecting removal of baffle 170 from nozzle 186, thereby arresting the piston movement. Control in this fashion is typically attained within one or two courses after the pneumatic stitch control device is activated, though the rapidity of action of this control is adjustable through control of valve 88.

During the knitting of the welt automatic stitch length control continues. If the stitches become too tight, the detector cam 150 is moved outwardly by the sinkers resulting in closure of nozzle 186 by baffle 170 and slight readjustment of the needle cylinder in an upward direction. On the other hand, if the stitches become too loose, the follower cam 150 moves inwardly with the result that nozzle 184 is closed by baffle 168 resulting in slight downward adjustment of the needle cylinder. Desirably, the automatic adjustment is relatively slow, so that there is no radical change in size of the stitches such as would produce an appearance of rings in the fabric. Due to the positioning of stirrup 106 by cam 134 the ball bearing was positioned to a height such that the piston in the pneumatic cylinder need only travel an amount equivalent (though in the opposite direction) to the distance it moved for fashioning to make welt stitches of the desired length as called for by the automatic control from the sinkers through cam 150. But even if cam 134 were omitted, the stitches would be controlled as to length in accordance with the setting of wedge 188, lever 122 operating then in a higher portion of its range of movement. Cam 134 is actually provided for a different purpose as will be shortly discussed. It may be noted that the stitch adjustment is not an adjustment of abnormal stitches already drawn, but rather is in the nature of a compensating adjustment of subsequently formed stitches both to balance the abnormal stitches and secure stitches of more proper length. This action of compensating for stitches of abnormal size is important throughout the formation of the circular knit parts of a stocking, and particularly the leg, to be sure of proper overall size of the stockings produced.

Continuing the description of the operation, following the transfer of the welt the drum 138 is advanced by engagement of lip 238 with cam end 236 to release cam 222 from its follower screw and to bring cam 224 into engagement with a second one of the screws 220 to position the wedge 188 properly for the formation of shadow welt stitches. The action is, of course, to reposition the slide 160 so that the automatic control may be effected from a different predetermined value of stitch length. Automatic control would then take place as before, and the screw 220 which follows cam 224 may be adjusted to secure the desired stitch length. It may be here remarked that adjustment of screw 193 is primarily to effect a common adjustment of all stitches while the relative positions of the screws 220 effect relative adjustments to the stitches in the different areas of the stocking.

There is, however, another matter involved in the transition from the welt to the shadow welt. As has been above mentioned, it is not desirable to have the automatic stitch length control operate rapidly since otherwise there may be produced horizontal streaks in the stockings. But without the provision of special control, this would result in an objectionable condition in the transition between the welt and shadow welt (and also between the shadow welt and leg). Ordinarily the shadow welt stitches are shorter than those desired for the welt, and if only the automatic control was involved there would be a slow variation of stitch length which would be objectionable in appearance. It was previously remarked that while the needle cylinder could be quickly moved from the main cam drum it could not be quickly moved from a position determined by the ball bearing 112 if the sole control of this ball bearing was from the lever 122 through its pneumatic drive. Accordingly, to produce a quick drop of the needle cylinder the cam 134 is caused to ride from beneath follower 130 so that the stirrup 106 will drop to a position determined by engagement of follower 132 with cam 136. This transition occurs in the step of the drum 138 previously mentioned in going into the formation of shadow welt stitches. The needle cylinder is thus dropped abruptly even though the lever 122 may have no appreciable movement during such drop. The drop of the needle cylinder is made to the extent approximately required for proper stitch length in the shadow welt. The lever 122 may then be slightly adjusted to secure precisely the desired stitch length as determined by the position of wedge 188. The slight readjustment thus involved following the beginning of the shadow welt is not noticeable in the appearance of the stitches and there is produced the desired sharp transition between the welt stitches and the shadow welt stitches. It will, of course, be obvious that if the shadow welt stitches are to be looser than the welt stitches the cam 136 in acting on follower 132 might actually raise the needle cylinder, here again providing a sharp transition such as desired from the standpoint of appearance.

At the beginning of formation of the leg actions similar to those just described take place, the drum 138 being again advanced so that the third screw 220 engages the initial portion of cam 226 to set the wedge 188 to proper position for the additional leg stitches. At the same time follower 132 drops off cam 136 to permit the cylinder to drop to a position determined by engagement of screw 126 with its abutment 128. Thus again there is provided a quick change of stitch size which is followed by automatic readjustment of the piston to accomplish automatic control of the stitches in accordance with the position of the wedge 188. Here, again, the position of the needle cylinder is approximately set by the adjustment of screw 126 as it engages the stop 128, and accordingly the automatic control is called upon merely to effect such minor adjustments as are required in view of variations in yarn tensions, or other matters which may affect stitch size. The sharp transition between switch sizes in the shadow welt and leg is highly desirable for the sake of appearance, there being generally also involved a yarn change which would make particularly noticeable any gradual change in stitch size.

Through the events already described the drum 138 has not been advanced sufficiently to permit engagement of pawl 229 with the leading tooth of the ratchet 228. At the time fashioning of the leg is to start, lip 238 will advance the end 236 of cam 222 to an extent bringing the leading ratchet tooth in position to be engaged by pawl 229. Thereafter, drum 138 is advanced through an arc corresponding to one tooth, desirably once for each four revolutions of the needle cylinder. The follower screw of lever 194 which follows cam 226 then rides down this cam producing step by step small incremental upward movemments of wedge 188 thereby causing slide 160 to be retracted from the axis of the needle cylinder. As the retracting steps occur, baffle 168 is caused to drop against nozzle 184 and upon each such occurrance automatic control is effected giving rise to a slight drop of the needle cylinder thereby producing a tightening of the stitches being formed such as will cause the sinker-follower cam 150 to move outwardly to establish equilibrium conditions. Thus there is produced progressive tightening of the stitches as determined by cam 226, the automatic control, of course, functioning also to maintain the stitches of the desired size, on the average, despite other factors such as changes in yarn tensions, temperature changes, or the like. The automatic fashioning control action just described is terminated when the screw 230 engages the portion 232 of bracket 218. The adjustment of screw 230 accordingly controls the minimum stitch size involved in the production of the ankle and also the foot.

At the start of the heel the automatic control is rendered inoperative by the action of cam 144 which raises rod 146 and link 148 to deactivate the control by locating its parts in the positions first described in this discussion of operation. As the result of knitting tight stitches in the ankle, the lever 122 will occupy a low position and will remain in this position due to the deactivation of the control. Accordingly the needle cylinder may be raised by the usual cams on the main cam drum to the proper position for the formation of desired heel stitches.

At the completion of the heel the automatic control may be resumed or not as desired. The arrangement specifically shown for the cam 144 in FIGURE 13 assumes that control is to be renewed during the formation of the foot of the stocking. The depression 145 in the cam 144 permits the control to be reactivated in passing from the heel to the foot. Generally, to provide avoidance of a sharp line of demarkation of stitches across the instep the wedge 188 will desirably continue in the position last occupied prior to the formation of the heel, i.e., the position in which screw 230 engages step 232. However, while this may be the initial position it will be obvious that fashioning may occur through the foot, involving widening thereof, by continuation of control under the action of cam 226 serving to rock the lever 194 so as to exert downward movement on the wire 190. Then when the knitting of the toe is started another high section of the cam 144 operates to deactivate the automatic control.

For automatic control of the foot stitches it is desirable to control the valve 63 from the pawl holder 69 as shown in FIGURE 29, the valve shutting off the air to the system from a time prior to completion of the heel until the pawl holder rides off the link of the chain 71 two courses after going out of the heel. Otherwise, the tight heel stitches would operate cam 150 so as to call for a looser stitch and the piston 92 would move far enough to make a loose course at the start of the foot. Accordingly, the control is held inoperative after plunger 146 drops into depression 145 until foot stitches are detected, whereupon the automatic control continues, being initiated by reopening of valve 63.

The drum 138 continues to step around until the last tooth of the ratchet 228 has been advanced. Thereupon the drum comes to rest, to be next moved by lip 238 as previously described.

In the foregoing the control of stitch size was accomplished by change of level of the needle cylinder, and the sinkers carried thereby, relatively to the needle operating cams. Stitch adjustment and control may be accomplished in other ways while utilizing the same general aspects of control which have been described. Various modifications of the stitch control will now be referred to.

Figure 16:
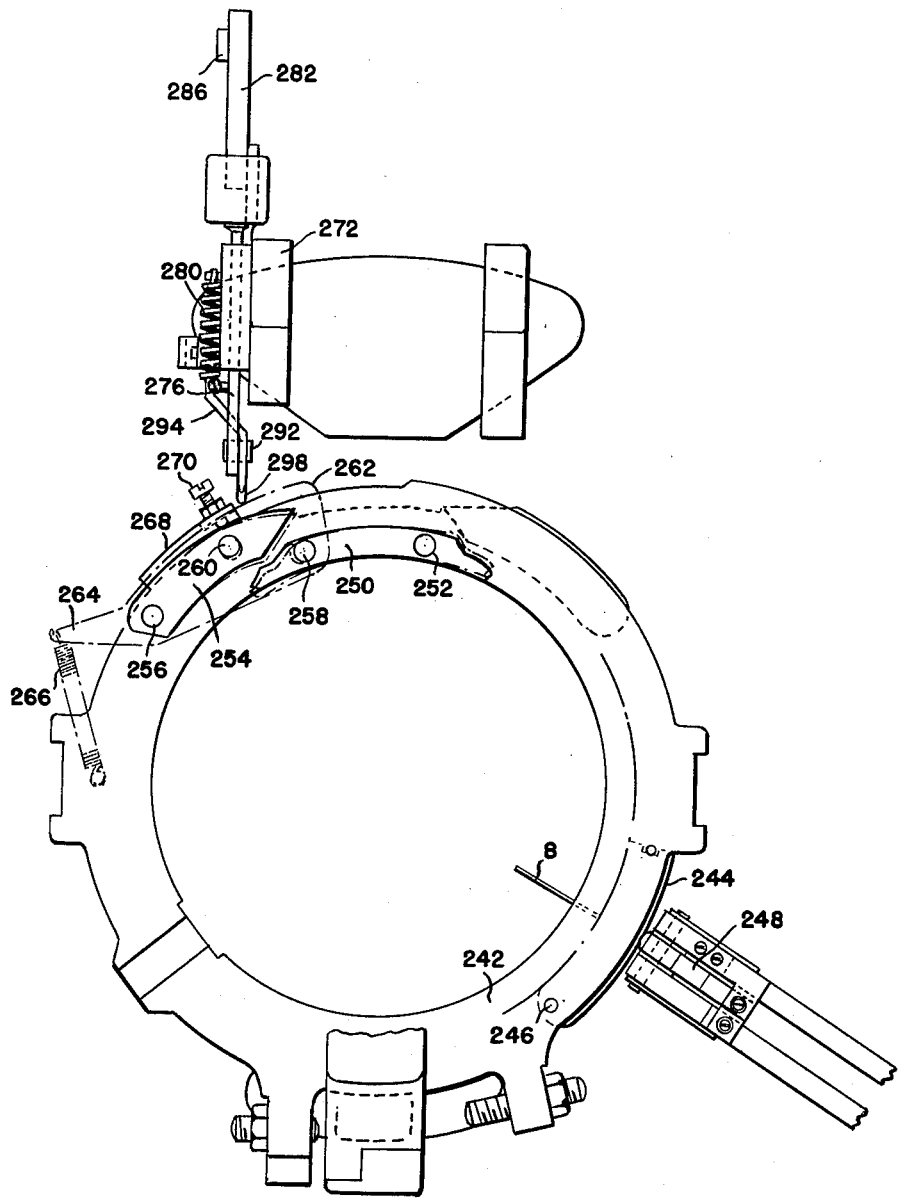
FIGURE 16 is a fragmentary plan view of an alternative stitch control arrangement involving control of the penetration of the sinkers between the needles.
Figure 17:
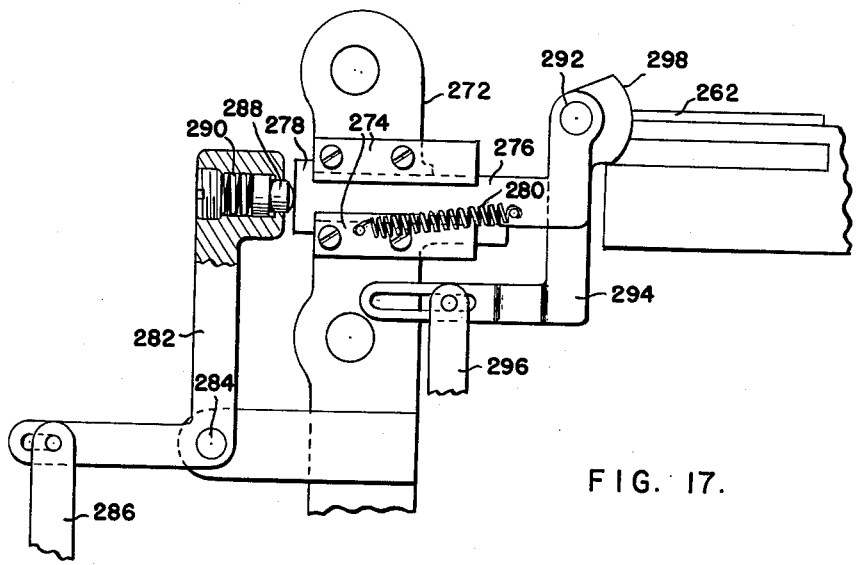
FIGURE 17 is a fragmentary elevation, partly in section, of a portion of the mechanism shown in FIGURE 16.
Figure 18:
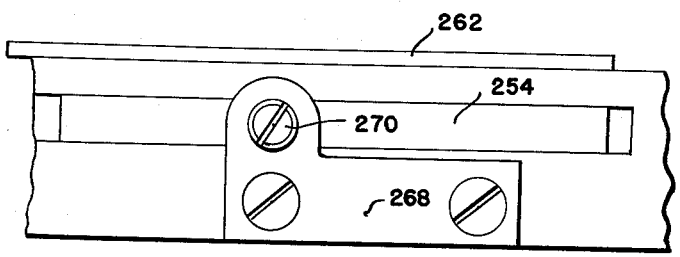
FIGURE 18 is a fragmentary elevation of a portion of the mechanism shown in FIGURE 16.

FIGURES 16, 17 and 18 show an arrangement which may be used for changing stitch size by control of the sinker movements. The sinker cap 242 is provided with a sinker butt detector cam 244 pivoted at 246 and arranged to act upon the lever 248, the arrangement for detection corresponding precisely to that previously disclosed, the lever 248 being the same as lever 156.

The center sinker cam 250 is of generally conventional shape but in this case is pivoted at 252. The rundown castoff sinker cam 254 is pivoted at 256. This cam also is substantially in its shape conventional, though the adjacent portions of the cams 250 and 254 are modified so that during simultaneous movements they will not pinch the sinker butts. Pins 258 and 260, respectively carried by the cams 250 and 254, extend upwardly through slots in the sinker cap and are pivoted in openings in a plate 262 which is also pivoted at 256, being provided with an extension 264 acted upon by a spring 266 serving to urge the plate 262 counterclockwise. A bracket 268 carried by the sinker cap is threaded to receive an adjustable stop screw 270 which bears against the outside of cam 254 to limit its outward movements. A bracket secured to the latch ring support post 272 is provided with guide elements 274 for a slide 276 which is provided with an enlarged T-shaped head 278 limiting its inward movement. A spring 280 urges the slide 276 outwardly. A lever 282 pivoted at 284 and operable by a thrust rod 286 acted upon by cams on the main cam drum, is provided with a pad 288 urged outwardly of its upper end by a strong spring 290 capable of overcoming the tension of spring 280. Pivoted at 292 on slide 276 is a lever 294 provided with a horizontal arm engageable by a link 296 which, depending upon the type of operation desired, may correspond either to link 98 of FIGURE 2 or to the follower screw 114 of the same figure. At its upper end the lever 294 is provided with an eccentric cam 298 engaging, when in operative position, the plate 262 and arranged to rock it about its pivot 256 against the action of spring 266.

Depending upon the connections of the elements just described operations may be effected in various different ways for control of stitches by producing greater or less inward movements of the sinkers under the action of cam 254. It may be noted that cam 250 is movable with cam 254 to provide control against overrun of the sinkers while still avoiding pinching of the sinker butts. The stitch controlling action, however, is dependent upon the position of cam 254.

The detector means comprising the lever 248 is identical with what has been previously described and effects pneumatic control of the operation of a piston similar to 92 but in this case possibly of considerably smaller size and stroke due to the fact that the parts to be moved are light in weight and under only slight restraint by springs as compared with the cylinder and tube assembly which have to be moved in accordance with the modification previously described. Assuming that the link 296 which may be adjustably positioned in the lever 294 is connected directly to the piston of a pneumatically driven arrangement such as that already described, the operation is as follows:

During the knitting of portions of a stocking in which no control is effected, the thrust rod 286 is in lowered position so that the spring 280 is free to retract the slide 276 and with it the cam 298, freeing the plate 262. It may be noted that under these conditions there is no possible conflict with reciprocatory movements of the latch ring during the knitting of heels and toes. As previously described in connection with the first modification the detecting means and the pneumatic control means may be completely deactivated by the withdrawal of the slide carrying the lever 248 along with deactivation of the baffle corresponding to 168. When stitch control is desired, thrust rod 286 is moved upwardly to force the slide 276 to its extreme inner position, thereby locating the cam 298 in position for operation. Control of a wedge such as 188 under the action of pattern devices of the type already described then control the size of stitches detected by the cam 244 following the sinkers 8 and effecting movement through the piston of the lever 294 and cam 298. If longer stitches are called for, the action is to drop lever 294 so as to move inwardly cam 254 and thereby cause the sinkers to draw longer stitches as they are formed. It may be noted that the movements of the cam 254 by reason of its pivotal mounting are such as to move the sinkers inwardly slightly earlier than usual and also slightly further than usual when the cam 254 is moved inwardly. By different mounting of the cam either of these actions alone may be used for the control of stitch size. If earlier inward movement of the sinkers is depended upon for control, the sinker cap may be moved by a mechanism of obvious type controlled through a thrust rod corresponding to 286. Conversely if stitches that are too large are being formed, the operation is such as to permit outward movement of cam 254 under the action of spring 266 thereby effecting the formation of smaller stitches.

The automatic control may be used not only for control of switch size but for fashioning. However, preferably its action is confined essentially to control of the stitch size against a normal magnitude by having the vertical relation between the needle and sinker controlled in the usual way from the main cam drum both for stitch changes in different parts of the stocking and also for fashioning, the automatic control only taking care of variations caused by the yarn, temperature change, etc. In such case, for example, in transitions from the welt to the shadow welt or from the shadow welt to the leg the needle cylinder may be rapidly moved to change the stitch size and at the same time the wedge 188 may also be rapidly moved. However, the control will then ordinarily be temporarily rendered ineffective since, as previously discussed, it is desirable that the automatic control should take place slowly. Nevertheless, quick transitions in stitch size will occur and after one or more revolutions of the needle cylinder the automatic control will become operative to take care of corrections of minor variations due to changes in yarn tension and other causes, the control being, however, about the desired stitch length determined primarily by the cylinder position. This type of control may be obviously applied to any of the modified arrangements herein described.

In similar fashion, the fashioning in the leg of the stocking is preferably primarily effected by reason of the adjustment of needle cylinder position. While the wedge 188 must be moved to correspond to the fashioning desired, what has just been stated means that the sinkers need have very little variations in their position, only sufficient to effect minor corrections. On the other hand, if there is dependence upon them for complete fashioning, then they will have correspondingly large variations in their paths with necessity for substantial movements of cam 254 throughout the full range of operation.

In accordance with the last modification described the castoff movements of the sinkers are controlled for control of stitches. Another alternative for stitch control may involve the use of sinkers having sloping ledges over which the stitches are drawn by the needles, with variations of sinker positions at the time the stitches are drawn. Such an arrangement is illustrated in FIGURES 19, 20 and 21.

Figure 19:
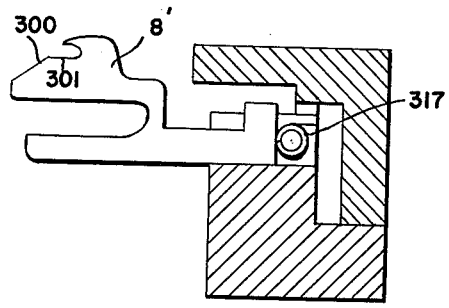
FIGURE 19 is a sectional view showing, in particular, a type of sinker which may be used for stitch control.

The type of sinker which may be used is illustrated at 8' in FIGURE 19 and is shown as comprising a sloping ledge portion 300 associated with the horizontal ledge portion 301 adjacent to the sinker throat. Various sinker constructions may be used with the sloping ledge 300 at greater or less angle and either associated with a horizontal ledge 301 or extending in sloping fashion to the sinker throat. If the automatic adjustments effected by radial sinker position are to be for minor corrections of stitch length a slight slope only is required. However, if the sinker positions are depended upon for major changes in stitch lengths then the slope may be quite steep.

Figure 20:
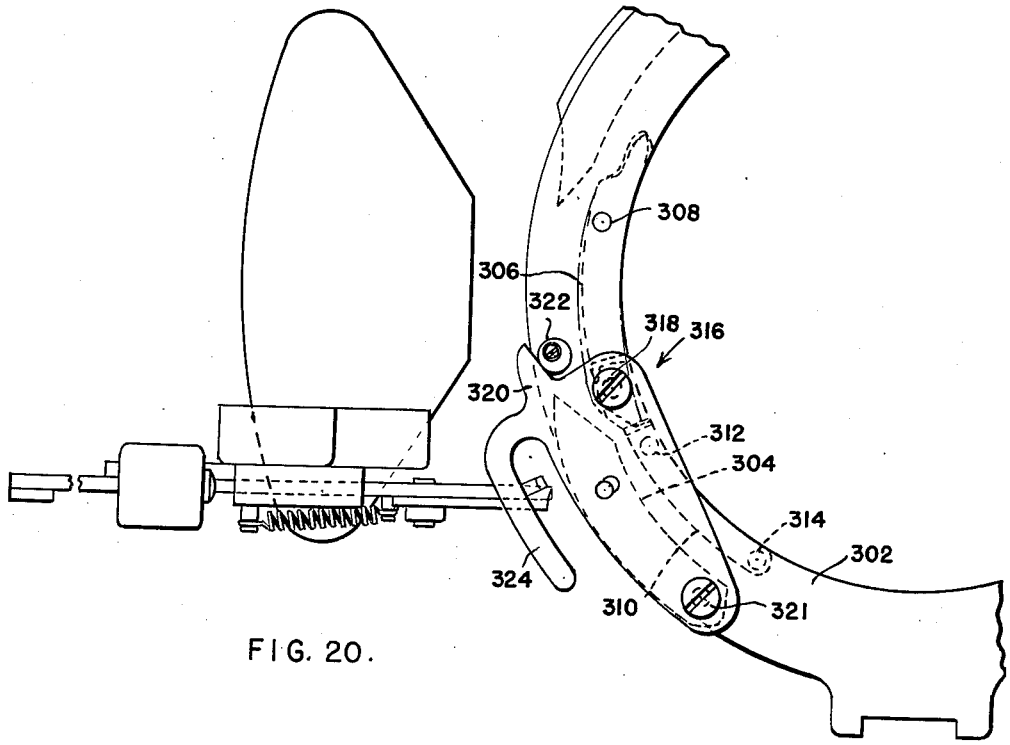
FIGURE 20 is a fragmentary plan view showing an alternative mechanism for producing the results secured by the mechanism of FIGURE 16.
Figure 21:
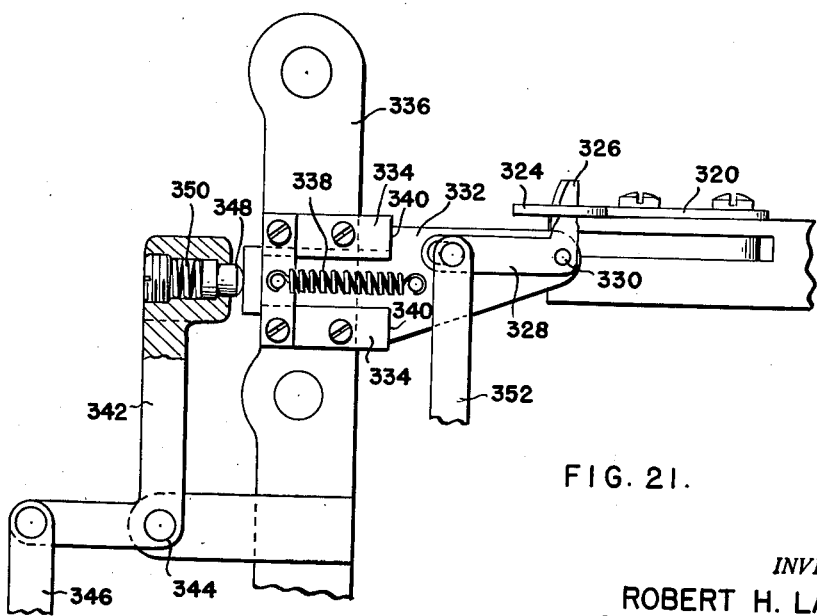
FIGURE 21 is an elevation, partly in section, of the mechanism shown in FIGURE 20.

FIGURES 20 and 21 illustrate a desirable type of mechanism for controlling the sinker positions. The sinker cap is indicated at 302 and supports the castoff cam 304 which, in this case may be fixed in position. The center cam desirably has two parts, the first, indicated at 306, being pivoted at 308 and the second indicated at 310 being fixed and secured at the points 312 and 314. These two cams overlap in the region 316 to present, for all positions of adjustment of cam 306 a smooth cam arrangement for operating on the sinker butts during either direction of movement. The spring band 317 urges the sinkers inwardly to cause them to follow the cam 306. The cam 306 at its free end is connected through a pin 318 to a plate 320 which is pivoted at 321 and is limited in its clockwise movement as viewed in FIGURE 20 by an adjustable eccentric stop 322. The plate 320 is provided with a hook portion 324 which is substantially concentric with the needle cylinder axis. This permits reciprocations of the sinker cap during reciprocatory knitting. The hook portion 324 is arranged to be engaged by the upstanding portion 326 of a bell crank 328 pivoted at 330 to a slide 332 which is slidable in guides 334 mounted on a bracket 336. The spring 338 urges the slide 332 to the left as viewed in FIGURE 21 toward a position limited by shoulders 340. A bell crank 342 pivoted at 344 to a bracket fastened to the latch ring support post 336 is operable from the main cam drum through a rod 346 and is provided with a pad 348 urged outwardly by a strong spring 350 capable of overcoming the tension of spring 338. A link 352 serves for operation of the bell crank 328 and may be operated in the same fashion as the link 296 already described and shown in FIGURE 17.

Detection of stitch size is accomplished as previously detailed in connection with the modification shown in FIGURES 16, 17 and 18.

In the operation involved in accordance with FIGURES 19, 20 and 21 control is effected by reason of the fact that the sinkers are variably positioned by the cam 306 under the action of spring band 317 at the time the stitches are drawn, the control resulting from the positioning of portions of the ledges at different heights at the locations where they are engaged by the yarn during stitch drawing. In the case of this modification numerous variations may be involved as described in conjunction with the modifications shown in FIGURES 16, 17 and 18. When the stitches are being controlled solely from the main cam drum, for example, by height adjustment of the needle cylinder, the automatic control is rendered inoperative in the fashions described above including the forcing upward of rod 346 which permits the sinkers to occupy their innermost position by release of the plate 320. Under these conditions, if the sinker shown in FIGURE 19 is used, the stitches will be drawn in conventional fashion over the horizontal portion 301 of the ledge. When automatic control is to occur, slide 332 is permitted to move to its extreme outer position, thereby moving the cam 306 into the range of positions wherein stitches will be drawn only on the sloping portion 300 of each sinker ledge, the needle cylinder being positioned so that, within the range of variations of engagement of ledge portion 300 by the yarn, stitches of proper size will be formed. Link 352 may be operated directly from a piston. These various aspects of operation have been already fully described and will not be here repeated since it is obvious that the operation in fundamental aspects is similar to what has already been described.

Figure 22:
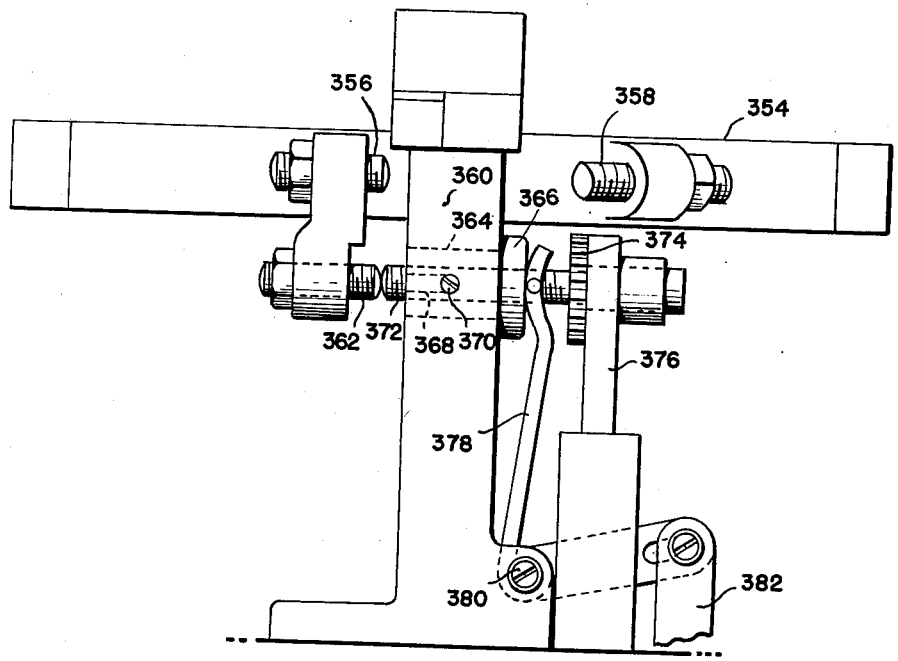
FIGURE 22 is a fragmentary elevation showing mechanism for securing control of stitch length by shift of position of the sinker cap.
Figure 23:
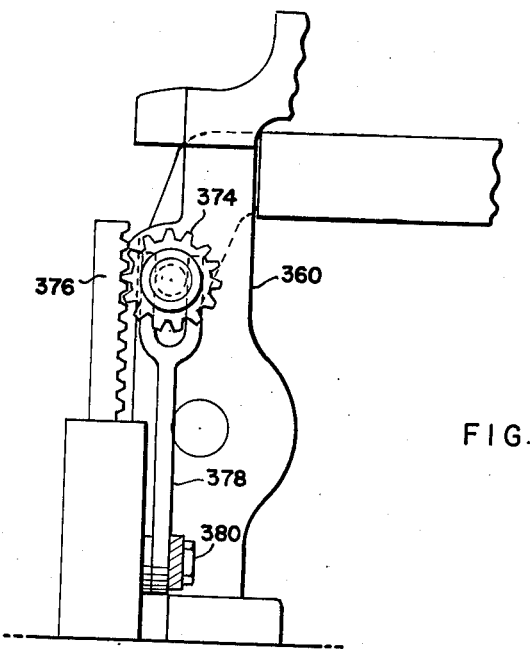
FIGURE 23 is an elevation looking at the right of FIGURE 22.

FIGURES 22 and 23 show still another modification in accordance with the invention in which stitch control is effected by change of position of the sinkers cams with respect to the needle operating cams in a circumferential direction.

A conventional sinker cap is indicated at 354 and is provided with the usual forward and reverse bumper screws 356 and 358 engageable with the bracket 360. In accordance with the invention an additional bumper screw 362 is provided. A bushing 366 has its shank 364 slidably mounted in an opening in the bracket 360 and is held against rotation by engagement of a screw 370, acting as a key, within a slot 368 in the bushing shank. The bushing 366 is internally threaded for the reception of a screw 372 the end of which is engageable by the bumper screw 362. At its right hand end the screw 372 has affixed thereto a pinion 374 arranged to be rotated by a rack 376 which is guided for vertical movements in by the machine frame. A forked lever 378 engages the head of the bushing 366 and is pivoted at 380 for operation through a link 382 connected to a cam following lever engageable by cams on the main cam drum. The rack 376 has its movements controlled directly or indirectly from a pneumatic cylinder of the type already described, and may be moved directly by being fastened to link 98 as shown in FIGURE 2.

During periods when automatic control is not effected, the bushing 366 is released by the lever 378, and the bumper screw 356 is then effective to determine the position of the sinker cap during movement of the needle cylinder in rundown direction either during rotary or during reciprocatory knitting. It will be noted that the added mechanism does not interfere with the action of the screw 358 in locating the sinker cap during reverse reciprocations in reciprocatory knitting.

When automatic control is to be effected, a cam on the main cam drum acting through link 382 forces the bushing 366 to its left-hand position so that the screw 372 is projected for engagement with the screw 362. In general, the screw 372 will be in such position that when rendered operative as just stated it will cause a clockwise movement of the sinker cap beyond the position determined by the normal bumper screw 356. Rotation of the screw 372 by the rack 376 controls its axial position thus adjusting the sinker cap position and, in particular, the position of the sinker projecting cam to control the knock-over action. This affects the size of stitches in the same general fashion as was involved in the operation of the modification involving FIGURE 16, with the sole difference that the time of inward sinkers movement relative to the needle wave is controlled by circumferential displacement of a cam similar to 254 rather than its radial displacement as shown in FIGURE 16.

It has been found that such variable positioning of the sinker cap will cause loosening of a comparatively loose stitch as well as a tight stitch, and accordingly the control of this type is effective for fine adjustments of stitch size even though the major action in controlling stitch size is by reason of the relationship of the height of the needle cylinder with respect to the needle operating cams. Accordingly, determination of stitch size and fashioning may be carried out by height changes of the needle cylinder in generally conventional fashion, the control of rack 376 then providing only corrective adjustments, a wedge such as 188 being, of course, adjusted to correspond to the size of stitches being produced.

It may be here remarked that the mechanism shown in FIGURES 22 and 23 may be used, in part, to advantage in conjunction with the stitch control of the type illustrated in FIGURE 16. In such case, the bushing 366 may be solid and arranged to act directly on an auxiliary bumper screw such as 362 under the selective control of a lever such as 378 controlled from the main cam drum of the machine. Rack 376, pinion 374 and screw 372 would then be omitted. The reason for this is that the position of the sinker cap during reciprocatory knitting of heels and toes is rather critical and should desirably be controlled by the conventional bumper screw 356. During heel and toe knitting, therefore, the bushing 366 would be inactive. On the other hand, during periods of stitch control utilizing the mechanism of FIGURE 16, the bushing 366 may be moved to its extreme left-hand position to cooperate with bumper screw 362 to position the sinker cap in the optimum position for control of sinker movements by the automatic controlling devices of FIGURE 16.

A somewhat similar, though reversed, operation may be advantageously effected in the matter of control in accordance with what is shown in FIGURES 20 and 21. In this case it is desirable to have the sinker cams advanced in action, that is, with the sinker cap in a more clockwise direction, during heel and toe knitting, and relatively retarded, that is, in a more counterclockwise position, during the knitting of stitches subject to automatic control. Accordingly in this case the bushing 366 would be used to position the sinker cap through cooperation with a bumper screw such as 362 during heel and toe knitting, whereas bumper screw 356 would be arranged to cooperate with bracket 360 during the knitting of controlled stitches as in the welt, shadow welt, leg and foot.

During heel and toe knitting it is frequently found desirable to have the sinkers start to move inward before the needles reach the deepest point of the stitch cam so that the yarn will ride over the neb of the first sinker associated with the idle needles which action not only prevents the yarn from being cut between the throats of the sinkers and the shanks of the idle needles but also leaves it in an ideal condition to be retrieved by the takeup as the cylinder reverses. On the other hand, in this modification the sinkers obviously should not start their inward movement until after the needles have reached their lowest point and have been slightly raised therefrom if good uniformity of stitches is to be achieved. For this reason the sinker cap can be allowed to drop back slightly during rotary work so the sinkers will not move in until after the needles have passed their lowest point and have been slightly raised.

For this purpose the needle raising cam should be stepped to first raise the needles slightly and then after a slight pause raise them to tuck height. This step rise may be a combination of the boxing in cam and the raise cam. However, it is possible though not very desirable to rely wholly on the takeup and movement of the sinkers for casting off the stitch during rotary knitting instead of relying on the throat of the sinker to cast off the old stitch.

Figure 24:
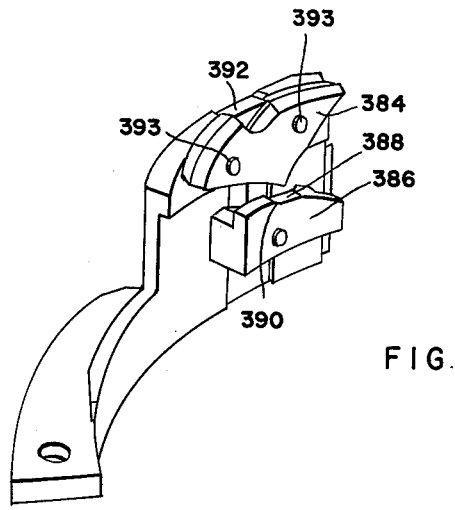
FIGURE 24 is a perspective view illustrating the control of stitch length by variation of position of the boxing-in cam associated with a forward stitch cam.
Figure 25:
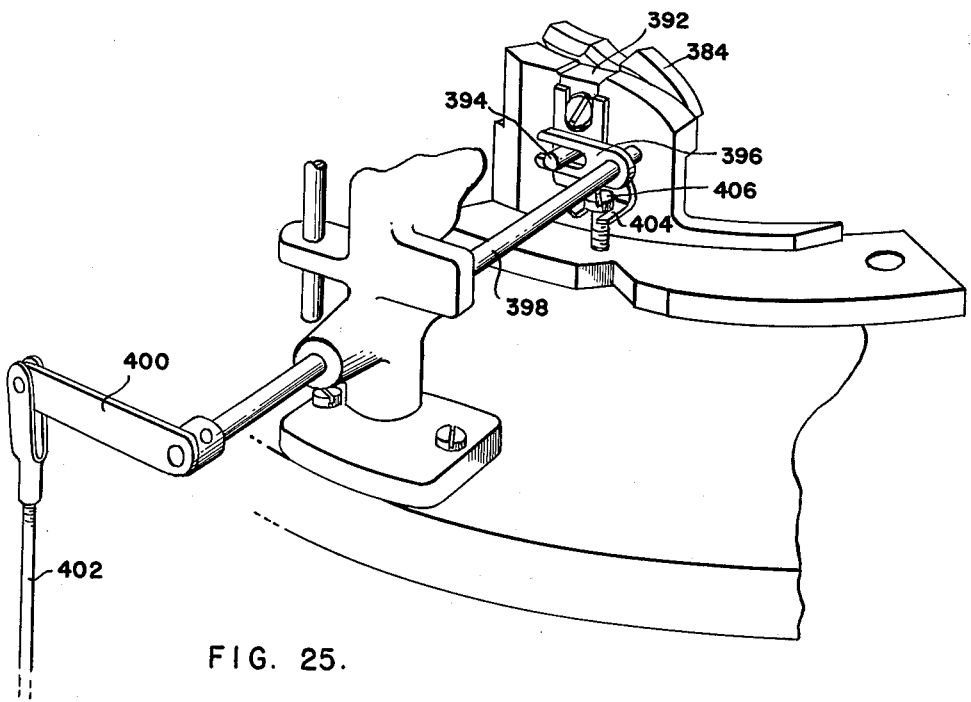
FIGURE 25 is a perspective view showing operating mechanism for the arrangement illustrated in FIGURE 24.

Stitch size may also be controlled over a small range either by leaving the needles at their deepest point for a longer period, thus cutting down the normal robbing of yarn from stitches already drawn, or by allowing the needles to fire to a lower point, or both. FIGURES 24 and 25 show the combination of these two actions involving only a minor change of conventional mechanism associated with the rundown stitch cam and its boxing-in cam.

The rundown stitch cam is indicated at 384, and the boxing-in cam at 386, the latter providing a horizontal cam surface 388 directly below the lowermost point of the stitch cam and followed by a rise cam portion at 390. Generally, the cam portion 388 clears the lowermost point of the stitch cam by little more than the spacing required for the free passage of needle butts, the cam portion 388 arresting the downward movements of the butts effected by the stitch cam to limit "firing" or overrun of the needles. Then, the needles rise slightly on cam 390. The position of cam 386 with respect to stitch cam 384 controls stitch size in two fashions; first, if the needles, rapidly moving down stitch cam 384, are free to move to greater extents through their own inertia, longer loops will be drawn. Since cam portion 388 limits downward movement, its vertical position controls, to a substantial extent the size of stitches drawn. Secondly, the size of stitches depends on how long the needles remain in their lowermost position. If they are held down for a sufficiently long period, the yarn reeving their hooks and over the sinker ledges is not free to be drawn into a new stitch being drawn. On the other hand, if at a position a few needles beyond the lowermost point of the stitch cam the needles are caused to rise, slack is produced in the yarn and robbing may occur, that is, the yarn relieved several needles in advance of that which has been newly drawn down will be reeved through the needle hooks and about the sinker ledges so as to add yarn to the loop being drawn with the result that this loop is not required to be made up entirely of yarn drawn from the feeding finger. The result is the ultimate production of smaller stitches, these stitches being finally sized as the needles rise over the cam rise 390. The amount of yarn which is thus robbed from previous stitches into the stitch undergoing formation depends upon both the amount of rise of the needles over the cam portion 390 and the timing of first engagement by the needles with this cam after leaving the lowermost point of the stitch cam, the latter being involved since, as will be evident, there is considerable friction imposed by the reeving of the yarn about the hooks and sinker ledges, and the friction thus opposing robbing is very much dependent upon how many times the yarn undergoes change of direction in this reeving process.

In accordance with this modification of the invention, therefore, the position of the boxing-in cam 386 with respect to the stitch cam is automatically adjusted, and it suffices to have this adjustment occur in a vertical direction though, obviously, a circumferential direction adjustment would also control stitch size.

To accomplish the desired end, use is made of the slide 392 and its usual connections. Ordinarily this slide 392 carries both stitch cam 384 and boxing-in cam 386, both cams being simultaneously vertically adjustable with maintenance of a fixed spacing between them. In accordance with the present invention, the stitch cam 384 is not carried by the slide 392 but, rather, is secured in fixed position to the cam support block as indicated at 393. The boxing-in cam 386 is secured to the slide 392 which is provided with a pin 394 engageable by the forked lever arm 396 secured to shaft 398 which through lever 400 and link 402 is arranged to be operated. Instead of the usual connections to link 402, this link is connected to the automatic controlling means previously described, for example, directly to the air cylinder or preferably by allowing the end of rod 402 to rest against and be moved by the outer race of ball bearing 112 in FIGURE 2, detector means and controlling means of the type previously described being used. The upward movement of cam 386 is limited by engagement of a small bracket 404 movable therewith with the underside of the head of an adjustable screw 406. It will be evident from what has just been said that stitch adjustment is controllable by the described relative movement of cam 386 with respect to the stitch cam 384. Stitch adjustments may only be effected to a small degree with this arrangement, but that suffices since, as previously described, the major changes in stitch size may be controlled by the usual vertical movements of the needle cylinder, so that the adjustment of cam 386 is called upon to make only minor corrections to maintain, on the average, normal stitch sizes corresponding to those intended to be provided by the height adjustments of the needle cylinder. The controlling mechanism may, obviously, be of the same type as previously described in detail. It will, of course, be evident that the stitch size may have major control from vertical movements of the stitch cam 384 with the needle cylinder fixed vertically, adjustments of the boxing-in cam being used only for minor corrections.

Figure 26:
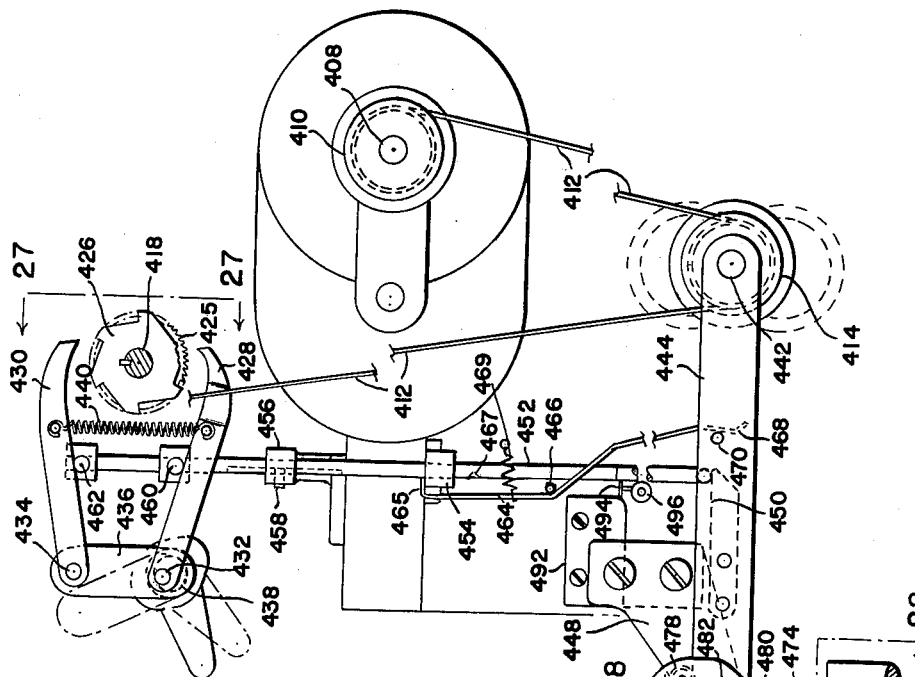
FIGURE 26 is an elevation with parts broken away, showing means for stitch length adjustment involving control of a takeup.
Figure 28:
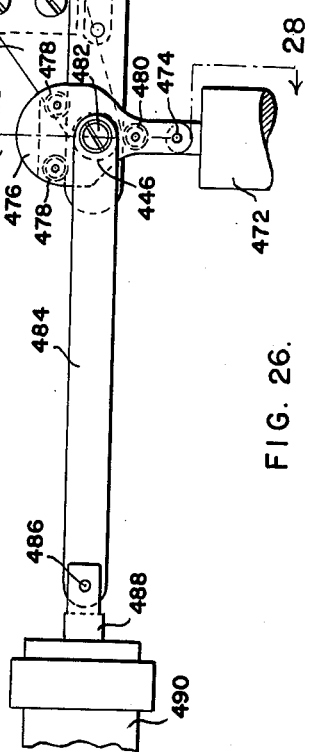
FIGURE 28 is a section taken on the broken surface indicated at 28—28 in FIGURE 26.
Figure 27:
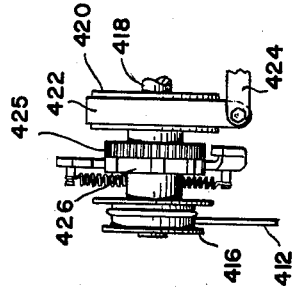
FIGURE 27 is an elevation looking in the direction of the arrows from the plane indicated at 27—27 in FIGURE 26.

FIGURES 26, 27 and 28 show a modification of the invention in which stitch size is controlled by the effective tension applied to the stocking by the grab takeup shown at 14 in FIGURE 1. As shown and described in my Patent 2,625,026, the weight of the grab takeup is partially balanced by the use of a counterweight. In accordance with the present invention the force applied by a counterweight is varied, thereby varying the effective tension applied to the stocking to adjust stitch length, larger stitches being produced when the takeup force is greater, and smaller stitches being produced when it is less.

The shaft 408 shown in FIGURE 26 mounts a small flanged drum 410, which drum in the conventional machine has wrapped thereabout the supporting cord of a counterweight. In the present instance the cord which is wrapped about the drum 410 is indicated at 412 and passes downwardly about a flanged pulley 414 and thence upwardly to be wound upon a drum 416 secured to a shaft 418 mounted in a bearing in the machine frame. The shaft 418 carries the brake drum 420 surrounded by a band 422 which is anchored at 424 to the frame and is adjustable to provide the desired amount of friction sufficient to hold the shaft 418 normally against rotation except when it is positively driven as hereafter described. Secured also to the shaft 418 are ratchets 425 and 426, the former having fine teeth and the latter coarse teeth. These ratchets are arranged to be driven, respectively, by pawls 428 and 430, the former being arranged to produce unreeling of the cord 412 from drum 416 while the latter produces reeling of the cord on this drum. The pawls 428 and 430 are respectively pivoted at 432 and 434 to an arm 436 carried by the oscillating shaft 438 which is shaft 98 of my prior patent. It will be noted that the pivotal connection 432 is much closer to the axis of shaft 438 than the pivot 434 and the pawls consequently have correspondingly short and long strokes. A spring 440 normally urges the pawls 428 and 430 toward each other and toward engagement with their respective ratchets.

The pulley 414 previously mentioned is journalled at 442 on an arm 444 which is pivoted at 446 to the machine frame. The lever 444 carries a cam 450 which engages the lower end of a rod 452 which is guided for vertical movement in the frame through brackets 454 and 456 and is prevented from turning by a screw 458 entering a longitudinal slot in the rod. The rod 452 carries a pair of adjustable collars from which project pins 460 and 462 arranged to space the pawls 428 and 430 which are urged towards each other by the spring 440. A lever 464 is provided with a turned end 465 and is pivoted at 466 to the frame, the end 465 being arranged to engage during certain operations as hereafter described within a notch 467 in the rod 452. The lower end of the lever 464 indicated at 468 is engageable by a pin 470 when the lever 444 is in approximately horizontal position, this action serving to withdraw the end 465 from a position in which it might engage the notch 467 and towards which it is urged by a spring 469.

A weight 472 is pivoted at 474 to a carriage 476 which is provided with rollers 478 and 480 engageable in upper and lower longitudinal grooves in the lever 444, the arrangement being such that the carriage may freely move with little friction along the length of the lever 444. Pivoted to the carriage at 482 is a link 484 which is in turn pivoted at 486 to the rod 488 of a piston operating in a cylinder 490 which may be of the type and arranged similarly to the cylinder 84 in FIGURE 2.

A microswitch 492 mounted on a bracket 448 secured to lever 444 at its pivot 446 is provided with an arm 494 and follower roller 496 engageable by the carriage 476 when the carriage is in a position approximately central of the lever 444. The purpose of this will be described hereafter.

As will be evident from the foregoing, the tension applied by the grab takeup to a stocking being knit will be dependent upon the position of the carriage 476 and weight 472 on the lever 444. The lever 444 itself acts as a partial counterbalance for the grab takeup and its counterbalancing effort is augmented as the carriage 476 moves toward the right in FIGURE 26. As the carriage moves toward the right the tension applied to the stocking is decreased and, accordingly, smaller stitches will be formed which, from the standpoint of the finished stocking, become what would be known as tight stitches. In the use of this modification of the invention, detecting and pneumatic controlling means as previously described are used for the control of movement of the carriage 476, the only difference over what has been already discussed being in the fashion in which stitch size is controlled by tension on the stocking while it is being knitted. The mechanism illustrated in FIGURES 26, 27 and 28 is primarily concerned with insurance that the desired variations in stocking tension may be applied irrespective of the portion of the range of movement in which the grab takeup is operating and for consistent operation under various conditions which arise or which may arise.

Under conditions of knitting with the grab takeup in action, the cord or cable 412 must be wound on the drum 410 and consequently must be unwound from the drum 416. This action is automatically accomplished with maintenance of definite tension on the cord or cable as follows:

As the grab takeup descends, the drum 410 is rotated to wind up the cord 412. Since brake 422 prevents drum 416 from turning, this would result in effecting a rise of the free end of lever 444. As this occurs, push rod 452 is raised to release pawl 428 for engagement with the teeth of ratchet 425 under the action of spring 440. Strokes of the pawl will then advance the ratchet producing unreeling from drum 416 until the lever 444 drops to such position that the rod 452 will move the pawl 428 out of engagement with the ratchet teeth. It will be noted that since pins 460 and 462 are engaged by pawls 428 and 430 and spring 440 acts between them the spring 440 does not prevent dropping of rod 452 to effect the operation described. The angular movement of lever 444 between its positions involved in this action is very small from a standpoint of possibility of varying the tension on the cord 412, and consequently the tension is substantially constantly measured by the position of the carriage 476 on lever 444.

Tension variation for the stitch adjustment is carried out in the same fashion of control by the detecting and intermediate means as previously described. The adjustment of stitch size may be for total control of size, or the adjustment of tension may be solely to correct for slight variations from desired stitch size, the major variations in transitions between different parts of the stocking and in fashioning in the leg being then accomplished in the conventional way by adjustment of the height of the needle cylinder.

At the completion of one stocking and the start of the next stocking the takeup is raised as described in my prior patent, effecting unwinding of the cable 412 from the drum 410. As this occurs the arm 444 will drop to bring pawl 430 into operative position. This pawl has a relatively long stroke and by operation on the coarse teeth of ratchet 426 effects takeup of the cord 412 by reeling it upon drum 416 at a rate in excess of that at which it is released by drum 410. The lever 444 controls the active strokes of the pawl 430, and consequently the action of effecting reeling on drum 416 is kept from getting so far in advance of release by drum 410 that the lever 444 would be unduly tilted.

Interruption of operation of carriage 446 during heel and toe formation, when the takeup weight is relieved as described in said patent is effected by shutting off the air supply to the cylinder 490 and its associated accumulator.

Since the entire welt up and including the transfer is made before the takeup is attached to the stocking, the carriage may be left in whatever position it last occupied during the toe, advance, toe, loopers loose course, loopers waste courses and makeup. During the making of the welt and before the takeup is attached it is desirable to place the carriage in a mid position on lever 444. To accomplish this it is desirable to provide a cam on the main cam drum of the machine to move the wedge 188 of the detecting mechanism to its extreme upper position wherein, by pulling the slide away from the center of the needle cylinder as far as possible, the conditions are set up as they would be for too loose a stitch. The action is then to move the carriage 476 outwardly from pivot 446 to a limiting position. This would have the effect, in normal operation, of adding weight to the counterbalance and thus lightening the takeup. On the next move of the main cam drum, which normally occurs in the middle of the welt, the wedge 188 is drawn down, allowing the slide which it controls to move toward the center of the needle cylinder. This would normally bring the carriage 476 toward the left as viewed in FIGURE 26 to its extreme left-hand position. The microswitch 492 is mounted on bracket 448 so as to move with lever 444 and is engaged by the carriage 476 when it reaches approximately its mid-position on lever 444. Switch 494 is connected to operate through a solenoid valve to shut off the air supply to cylinder 490 stopping further movement of the carriage. Switch 492 is arranged to be effective only during the last part of the welt formation wherein it is to operate, the electrical circuit being deenergized at all other times by a suitable master switch controlled from the main cam drum.

A resetting device generally similar to the above may be applied to the other methods of stitch control herein disclosed. By way of example of means for accomplishing this reference may be made to FIGURE 30 which in turn is similar to FIGURE 2 but with controls added to reset the piston 92 to approximately correct height, for starting the welt of the stocking.

Figure 33:
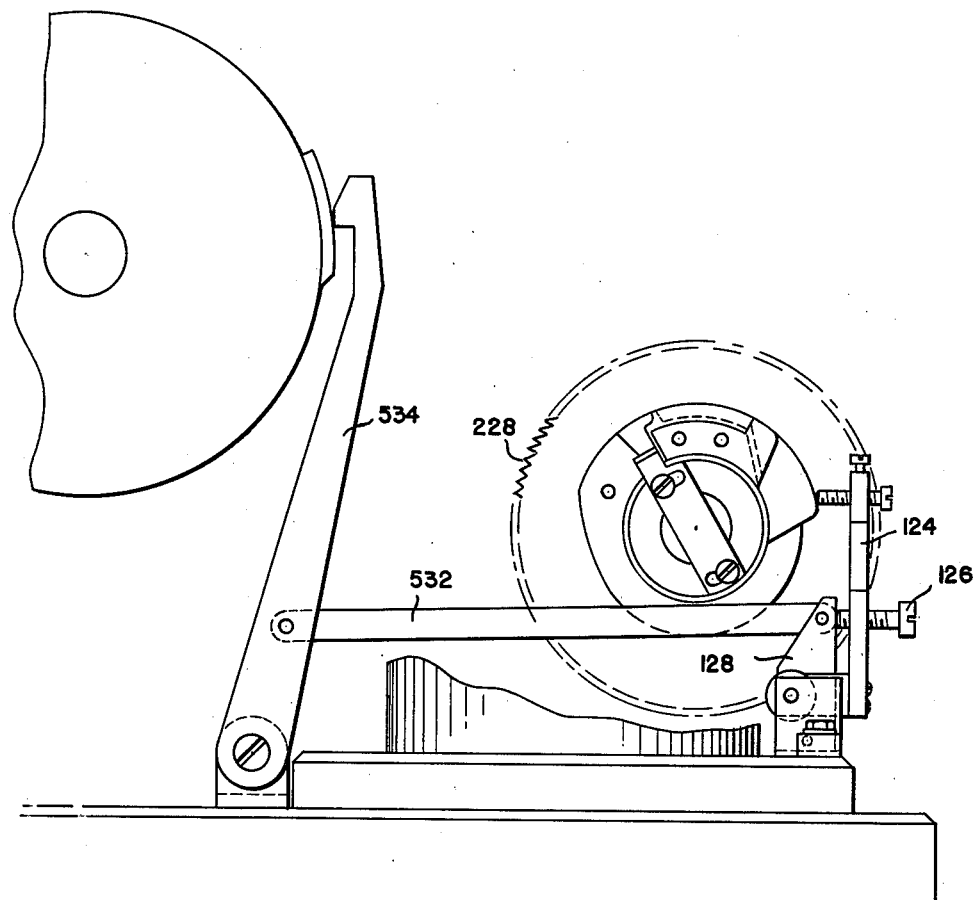
FIGURE 33 is a fragmentary elevation showing certain special stitch length control means.
Figure 34:
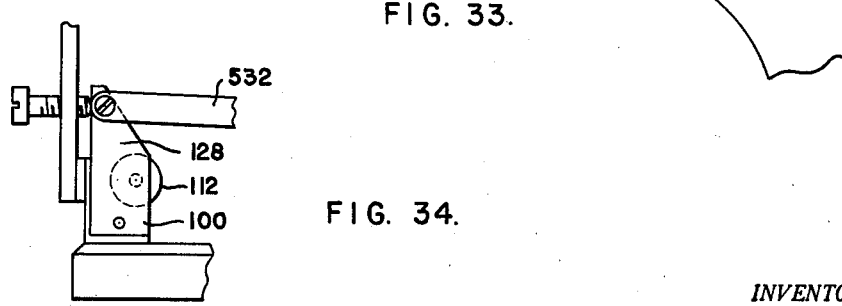
FIGURE 34 is a fragmentary detail of the same.

As heretofore explained, at the completion of the stocking piston 92 will be in its lowest position, where it was placed to make the tight stitch required in the ankle and foot. During the completion of the toe, or preferably during the making of the loopers waste courses, master switch 526 (a normally open switch) is closed by a cam 528 located on the main drum. This will cause current to flow thru normally closed switch 492' causing solenoid operated valve 530 to open supplying air to the bottom of cylinder 84. Air thus supplied will cause piston 92 to rise. A cam 476' fastened to slide 96 will cause switch 492' to open when piston 92 has reached the desired height, deenergizing solenoid valve 530 and shutting off the air to the base of cylinder 84 and leaving piston 92 at the height desired for starting the welt. The next drum move will open switch 526 so solenoid valve 530 will not operate until the end of the next stocking is reached. If this system is used it is desirable that provision be made for swinging stirrup 106 to lower ball bearing 112 to a lower position than allowed by screw 126 which was set for ankle tension as shown in FIGURES 33 and 34. The reason for this is to allow piston 92 to rise with consequent upward movement of the outer race of bearing 112 without its contacting screw 114 which would cause an undesirable loose stitch in the toe or loopers waste courses wherever the resetting is to be made.

To overcome this extension 128 is pivoted on bracket 100 and connected by link 532 to the mid-portion of lever 534 which is pivoted at the base of the machine just under the main drum as shown in FIGURE 33. The upper end of lever 534 is operated by cams on the main drum. This arrangement also makes it possible to knit heels and toes with a tighter stitch than that used in the ankle, pivoted extension 128 as shown in FIGURE 34 being allowed to fall back as viewed in FIGURE 33 for this purpose.

Lever 444 and its pulley 414 are placed sufficiently low under the pulley or drum 410 to allow the grab takeup to drop to its lowest position in case the thread breaks anywhere in the stocking. When this occurs the pulley 414 will be raised to a high level and cause the lever 444 to assume a steep angle. Under these conditions, as rise takes place, the lever 464 is released by pin 470 so as to be free to move inwardly into notch 467 when required. As the lever 444 tilts, the rod 452 is raised until the end of cam 450 clears its lower end. At this time the notch 467 will be in position to receive the end 465 of lever 464 and rod 452 is prevented from dropping downwardly as cam 450 passes and rises above its lower end.

Thereafter, when lever 444 returns to its normal position the cam 450 will pass the lower end of rod 452, possibly springing it slightly toward the right, and then as normal position of lever 444 is reached pin 470 will engage the end 468 of the latch lever 464 to release the rod 452 to its normal position. What has just been described is for abnormal conditions existing when the yarn breaks, and the fabric is accordingly pressed off, or when the machine is racked around other than by the chain causing the takeup to drop at a high rate of speed.

It will be evident from the foregoing that in accordance with the invention control of stitch size and of length of stockings may be effected in various ways, and it is therefore to be understood that the invention is not to be regarded as limited except as required by the following claims.

What is claimed is:

1. Stitch control means for a knitting machine having needles and elements cooperating therewith for the formation of stitches, comprising sensing means responsive to the size of stitches produced, and means responsive to said sensing means for controlling the size of stitches being formed, the last mentioned means comprising pneumatic motor means and air flow controlling means therefor operated by said sensing means.

2. Stitch control means for a knitting machine having needles, elements cooperating therewith for the formation of stitches, and pattern control means, comprising sensing means responsive to the size of stitches produced; and means for controlling the size of stitches being formed; the last mentioned means comprising pneumatic motor means, means jointly controlled by said pattern control means and pneumatic motor means to control stitch size, and controlling means for said motor means operated by said sensing means.

3. Stitch control means for a knitting machine having needles, elements cooperating therewith for the formation of stitches, and pattern control means, comprising sensing means engaging stitches substantially at the time of their formation and responsive to the size of stitches produced; and means for controlling the size of stitches being formed; the last mentioned means comprising motor means, means jointly controlled by said pattern control means and motor means to control stitch size, and controlling means for said motor means operated by said sensing means.

4. Stitch control means for a knitting machine having needles and elements cooperating therewith for the formation of stitches, comprising sensing means responsive to the size of stitches produced, and means responsive to said sensing means for controlling the size of stitches being formed, the last mentioned means comprising pneumatic motor means and controlling means therefor operated by said sensing means, the last mentioned controlling means comprising nozzle and baffle elements relatively movable by said sensing means.

5. Stitch control means for a knitting machine having needles and elements cooperating therewith for the formation of stitches, comprising sensing means responsive to the size of stitches porduced, and means responsive to said sensing means for controlling the size of stitches being formed, the last mentioned means comprising pneumatic motor means and controlling means therefor operated by said sensing means, the last mentioned controlling means comprising nozzle and baffle elements relatively movable by said sensing means; and means varying the effect of said sensing means on the relative positions of said nozzle and baffle elements.

6. Stitch control means for a knitting machine having a needle bed, needles supported therein, needle operating cams, elements cooperating with the needles for the formation of stitches, and pattern control means, comprising sensing means responsive to the size of stitches produced; and means responsive to said sensing means for control of the size of stitches being formed; the last mentioned means comprising slowly acting motor means for control of the relationship between the needle operating cams and the needle bed, controlling means for said motor means operated by said sensing means, and means controlled by said pattern control means for effecting quick changes of the relationship between the needle operating cams and the needle bed.

7. Stitch control means for a knitting machine having needles, elements cooperating therewith for the formation of stitches, and pattern control means, comprising sensing means engaging stitches substantially at the time of their formation and responsive to the size of stitches produced, means responsive to said sensing means for controlling the size of stitches being formed, and means controlled by said pattern control means for rendering inoperative said means for controlling size of stitches upon occurrence of a substantial desired stitch change.

8. Stitch control means for a knitting machine having needles, elements cooperating therewith for the formation of stitches, and pattern control means, comprising sensing means responsive to the size of stitches produced, means responsive to said sensing means for controlling the size of stitches being formed, the last mentioned means comprising pneumatic motor means and controlling means therefor operated by said sensing means, and means controlled by said pattern control means for cutting off air supply to said motor upon occurrence of a substantial desired stitch change.

9. Stitch control means for a knitting machine having needles, elements cooperating therewith for the formation of stitches, and pattern control means, comprising sensing means responsive to the size of stitches produced, means for controlling the size of stitches being formed; the last mentioned means comprising motor means, means jointly controlled by said pattern control means and motor means, and controlling means for variably positioning said motor means operated by said sensing means; and means for rendering ineffective control of stitch size by said motor means irrespective of the position of said motor means.

10. Stitch control means for a knitting machine having needles, elements cooperating therewith for the formation of stitches, and pattern control means, comprising sensing means engaging stitches substantially at the time of their formation and responsive to the size of stitches produced; and means for controlling the size of stitches being formed; the last mentioned means comprising motor means, means jointly controlled by said pattern control means and motor means, and controlling means for said motor means operated by said sensing means, said means jointly controlled by said pattern control means and motor means controlling stitch size and being primarily responsive to said pattern control means in controlling stitch size, and said motor means being effective to make minor adjustments of stitch size.

11. Stitch control means for a knitting machine having needles, elements cooperating therewith for the formation of stitches, and pattern control means, comprising sensing means responsive to the size of stitches produced; and means for controlling the size of stitches being formed; the last mentioned means comprising motor means, means jointly controlled by said pattern control means and motor means, and controlling means for said motor means operated by said sensing means, said motor means being relatively slowly acting in the control of stitch size, and said means controlled by said pattern control means and motor means effecting quick changes of stitch size in response to said pattern control means.

12. Stitch control means for a knitting machine having needles, elements cooperating therewith for the formation of stitches, and pattern control means, comprising sensing means engaging stitches substantially at the time of their formation and responsive to the size of stitches produced; and means for controlling the size of stitches being formed; the last mentioned means comprising motor means, means jointly controlled by said pattern control means and motor means, and controlling means for said motor means operated both by said sensing means and said pattern control means.

13. Stitch control means for a knitting machine having needles, elements cooperating therewith for the formation of stitches, and pattern control means, comprising sensing means responsive to the size of stitches produced; and means for controlling the size of stitches being formed; the last mentioned means comprising motor means, means jointly controlled by said pattern control means and motor means, and controlling means for said motor means operated both by said sensing means and said pattern control means, said jointly controlled means being effective in response to said pattern control means to produce quick changes of stitch size, said motor means being relatively slowly acting and effective to make minor adjustments of stitch size.

14. Stitch control means for a knitting machine having needles, elements cooperating therewith for the formation of stitches, and pattern control means, comprising sensing means responsive to the size of stitches produced; means for controlling the size of stitches being formed; the last mentioned means comprising motor means, means jointly controlled by said pattern control means and motor means, and controlling means for variably positioning said motor means operated by said sensing means; means for rendering ineffective control of stitch size by said motor means irrespective of the position of said motor means; and means for setting said motor means independently of said sensing means, said means for rendering ineffective control of stitch size by said motor means being operative during such setting operation.

References Cited in the file of this patent

UNITED STATES PATENTS

| | | |
|---|---|---|
| 2,516,535 | Stack | July 25, 1950 |
| 2,685,786 | Stack | Aug. 10, 1954 |
| 2,839,907 | Butler | June 24, 1958 |